US012792378B2

(12) United States Patent
Yoon et al.

(10) Patent No.: US 12,792,378 B2
(45) Date of Patent: Nov. 10, 2026

(54) DISPLAY APPARATUS FOR VEHICLE

(71) Applicant: LG Electronics Inc., Seoul (KR)

(72) Inventors: Jaegu Yoon, Seoul (KR); Yuseok Yang, Seoul (KR); Eunjin Kim, Seoul (KR); Daeyoung Jeong, Seoul (KR); Dongwoo Han, Seoul (KR); Dongkyu Lee, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 18/278,157

(22) PCT Filed: Aug. 13, 2021

(86) PCT No.: PCT/KR2021/010772
§ 371 (c)(1),
(2) Date: Aug. 21, 2023

(87) PCT Pub. No.: WO2022/181903
PCT Pub. Date: Sep. 1, 2022

(65) Prior Publication Data

US 2024/0134675 A1 Apr. 25, 2024
US 2024/0231881 A9 Jul. 11, 2024

(30) Foreign Application Priority Data

Feb. 26, 2021 (KR) ........................ 10-2021-0026453
Apr. 23, 2021 (KR) ........................ 10-2021-0053004

(51) Int. Cl.
*G06F 9/455* (2018.01)
*B60K 35/21* (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
CPC ................. G06F 9/45558; G06F 9/544; G06F 2009/4557; G06F 2009/45579; G06F 2009/45583; G06F 2009/45595
See application file for complete search history.

(56) References Cited

U.S. PATENT DOCUMENTS

2016/0328254 A1* 11/2016 Ahmed ............... G06F 9/45545
2020/0218443 A1* 7/2020 Narayan ................ B60K 35/22
(Continued)

FOREIGN PATENT DOCUMENTS

CN 111949398 A * 11/2020 ........... G06F 9/5077
CN 112015516 A * 12/2020 ......... G06F 9/45558
(Continued)

OTHER PUBLICATIONS

Bjelica et al., "Central Vehicle Computer Design: Software Taking Over," IEEE Consumer Electronics Magazine, Oct. 2019, pp. 84-90.
(Continued)

*Primary Examiner* — Diem K Cao
(74) *Attorney, Agent, or Firm* — Fish & Richardson P.C.

(57) ABSTRACT

A display apparatus for vehicle includes: a first display and a second display implemented in a vehicle, a first signal processing device comprising a first processor configured to perform signal processing for the first display and the second display, and a second signal processing device comprising a second processor configured to perform signal processing for a third display. The first processor is configured to execute first, second, and third virtual machines on a hypervisor in the first processor. The first virtual machine in the processor is configured to, based on the first signal processing device being operated as a master signal processing device among the first signal processing device and the second signal processing device, share at least some of data with the second signal processing device for divided processing of data.

20 Claims, 26 Drawing Sheets

(51) Int. Cl.

| | |
|---|---|
| ***B60K 35/22*** | (2024.01) |
| ***B60K 35/29*** | (2024.01) |
| ***G06F 3/14*** | (2006.01) |
| ***G06F 9/54*** | (2006.01) |
| *B60K 35/00* | (2006.01) |
| *B60R 16/023* | (2006.01) |
| *G09G 5/14* | (2006.01) |
| *G09G 5/377* | (2006.01) |

(52) U.S. Cl.

CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 3/1438* (2013.01); *G06F 3/1454* (2013.01); *G06F 2009/4557* (2013.01); *G06F 2009/45579* (2013.01); *G06F 2009/45583* (2013.01); *G06F 2009/45595* (2013.01); *G09G 5/14* (2013.01); *G09G 5/377* (2013.01); *G09G 2360/06* (2013.01); *G09G 2370/022* (2013.01); *G09G 2380/10* (2013.01)

(56) References Cited

U.S. PATENT DOCUMENTS

| | | | | |
|---|---|---|---|---|
| 2020/0219469 | A1 | 7/2020 | Mittal et al. | |
| 2021/0219002 | A1* | 7/2021 | Barnes ............. | B64D 11/00155 |

FOREIGN PATENT DOCUMENTS

| | | | |
|---|---|---|---|
| JP | 6523298 | | 5/2019 |
| KR | 20010053431 | | 6/2001 |
| KR | 101639797 | | 7/2016 |
| KR | 20190109021 | | 9/2019 |
| KR | 20200110229 | | 9/2020 |
| WO | 2015/103376 | A1 | 7/2015 |

OTHER PUBLICATIONS

Chisnall, "The Definitive Guide to the Xen Hypervisor," Prentice Hall Open Source Software Development Series, Nov. 2007, 307 pages.

Extended European Search Report in European Appln. No. 21928197.9, mailed on Jan. 20, 2025, 12 pages.

Mishra et al., "Master-Slave Group Based Model For Co-ordinator Selection, An Improvement of Bully Algorithm," Paper, Presented at the 2014 International Conference on Parallel, Distributed and Grid Computing, Solan, India, Dec. 11-13, 2014, pp. 457-460.

Sharma et al., "VSense: Virtualizing Stateful Sensors With Actuators," Jul. 16, 2009, retrieved on Oct. 19, 2023, retrieved from URL <https://citeseerx.ist.psu.edu/document?repid=rep1&type=pdf&doi=b5d27161f4bf3404e6f84ce71a2f763caaf7475a>, 14 pages.

Wu et al., "Comprehensive VM Protection against Untrusted Hypervisor through Retrofitted AMD Memory Encryption," Paper, Presented at the 2018 IEEE International Sumposium on High Performance Computer Architecture (HPCA), Vienna, Austria, Feb. 24-28, 2018, pp. 441-453.

* cited by examiner

FIG. 9C (a)

| VM | Capability | Resources |
|---|---|---|
| Server VM | Object Detection | 30% CPU/GPU/NPU |
| Server VM2 | Media DRM | 40%<br>VPU, Enc/Decrypt HW |

(b)

| VM | Capability | Resources |
|---|---|---|
| Server VM | Object Detection | 30% CPU/GPU/NPU |
| Server VM2 | Distributed<br>Rendering Object | 35%<br>CPU, GPU |

(c)

| VM | Capability | Resources |
|---|---|---|
| Server VM | Media DRM | 40%<br>VPU, Enc/Decrypt HW |
| Server VM2 | Distributed<br>Rendering Object | 35%<br>CPU, GPU |

DISPLAY APPARATUS FOR VEHICLE

CROSS-REFERENCE TO RELATED APPLICATIONS

This application is a National Stage application under 35 U.S.C. § 371 of International Application No. PCT/KR2021/010772, filed on Aug. 13, 2021, which claims the benefit of Korean Patent Application No. 10-2021-0026453, filed on Feb. 26, 2021 and Korean Patent Application No. 10-2021-0053004, filed on Apr. 23, 2021. The disclosures of the prior applications are incorporated by reference in their entirety.

TECHNICAL FIELD

The present disclosure relates to a display apparatus for vehicle, and more particularly, to a display apparatus for vehicle capable of dividing and processing data using a plurality of signal processing devices for a plurality of displays in a vehicle.

BACKGROUND

A vehicle is an apparatus that a driver moves in a desired direction. A representative example of the vehicle is a car.

In some implementations, a display apparatus for vehicle is mounted in the vehicle for convenience of users who use the vehicle.

For example, a display is disposed in a cluster in order to display various kinds of information. By way of further example, in order to display vehicle driving information, various displays, such as an audio video navigation (AVN) display and a rear seat entertainment display, are mounted in the vehicle, in addition to the cluster.

As the number of displays in the display apparatus for vehicle is increased, as described above, a plurality of signal processing devices for a plurality of displays are used.

However, when the plurality of signal processing devices for the plurality of displays are used, resources may be inefficiently managed if the signal processing devices do not share data.

SUMMARY

The present disclosure is directed to a display apparatus for vehicle capable of dividing and processing data using a plurality of signal processing devices for a plurality of displays in a vehicle.

The present disclosure is also directed to a display apparatus for vehicle capable of efficiently managing resources using a plurality of signal processing devices for a plurality of displays in a vehicle.

The present disclosure is also directed to a display apparatus for vehicle capable of setting any one of a plurality of signal processing devices for a plurality of displays in a vehicle as a master signal processing device to efficiently perform data processing.

The present disclosure is also directed to a display apparatus for vehicle capable of performing high-speed data communication between a plurality of virtual machines or a plurality of signal processing devices.

The present disclosure is also directed to a display apparatus for vehicle capable of performing high-speed data communication even though a plurality of virtual machines or a plurality of signal processing devices are driven by different operating systems.

According to one aspect of the subject matter described in this application, a display apparatus for vehicle can include a first display and a second display implemented in a vehicle, a first signal processing device comprising a first processor configured to perform signal processing for the first display and the second display, and a second signal processing device comprising a second processor configured to perform signal processing for a third display. The first processor can be configured to execute first, second, and third virtual machines on a hypervisor in the first processor, and the first virtual machine in the processor can be configured to, based on the first signal processing device being operated as a master signal processing device among the first signal processing device and the second signal processing device, share at least some of data with the second signal processing device for divided processing of data.

Implementations according to this aspect can include one or more of the following features. For example, the second processor can be configured to execute a server virtual machine configured to, based on the second signal processing device being operated as a master signal processing device among the first signal processing device and the second signal processing device, share at least some of data with the first signal processing device for divided processing of data.

In some implementations, the first virtual machine can be configured to read capability information or resource information of the second signal processing device, and operate, based on the capability information or the resource information of the second signal processing device, any one of the second signal processing device or the first signal processing device as a master signal processing device. In some implementations, the first processor can be configured to execute the first, second, and third virtual machines on the hypervisor in the processor, the second virtual machine can be operated for the first display, and the third virtual machine can be operated for the second display.

In some examples, the first virtual machine can be configured to receive, from a sensor implemented in the vehicle, wheel speed sensor data of the vehicle, process the wheel speed sensor data, and transmit the processed wheel speed sensor data to at least one of the second virtual machine, the third virtual machine, or the second signal processing device. In some implementations, the first virtual machine can be configured to transmit, to the second signal processing device, an access message for access to a deserializer network, and operate, based on an access allowance message for access to the deserializer network not being received from the second signal processing device, the first signal processing device as the master signal processing device. In some implementations, the first virtual machine can be configured to transmit, to the second signal processing device, an access message for access to a deserializer network, and operate, based on an access allowance message for access to the deserializer network being received from the second signal processing device, any one of the second signal processing device or the first signal processing device as the master signal processing device based on the capability information or the resource information of the second signal processing device.

In some examples, the first virtual machine can be configured to determine whether a server virtual machine in the second signal processing device is driven based on protocol information received from an outside of the display apparatus, and operate, based on the server virtual machine in the second signal processing device not being driven, the first signal processing device as the master signal processing device. In some examples, the first virtual machine can be configured to determine whether resources of the second signal processing device are sharable based on the capability information or the resource information of the second signal processing device, and share, based on the resources being sharable, at least some of processed data with the second signal processing device.

In some examples, the first virtual machine can be configured to transmit, based on the first signal processing device being the master signal processing device, an authority transfer message to a server virtual machine in the second processor, and change, based on an acknowledgement message being received from the server virtual machine in the second processor, the second signal processing device to the master signal processing device.

In some implementations, the first virtual machine can be configured to receive, from the second signal processing device, capability information or resource information of a plurality of virtual machines driven in the second signal processing device, and control, based on the capability information or the resource information of the plurality of virtual machines, any one of the plurality of virtual machines driven in the second signal processing device. In some implementations, the first virtual machine in the first processor can be configured to write camera data in a first shared memory and transmit some of the camera data to the second signal processing device, the second processor can operate a server virtual machine configured to write the received some of the camera data in a second shared memory, and the second processor can execute a guest virtual machine configured to (i) process at least some of the data written in the second shared memory and (ii) write the processed data in the second shared memory.

In some examples, the second virtual machine in the first processor can be configured to display an image on the display based on the data written in the second shared memory. In some examples, the first virtual machine in the first processor can be configured to create a command queue for distributed processing of the data. In some implementations, the command queue can comprise at least one of command type information, buffer ID information, or buffer address information.

In some examples, the first virtual machine in the first processor can be configured to create command queues corresponding to a number of virtual machines for distributed processing of the data. In some examples, the first virtual machine in the first processor can be configured to write, in the first shared memory, some of the camera data to be transmitted to the second processor, and the guest virtual machine in the second processor can be configured to (i) perform object detection for the received camera data and (ii) write data from which an object has been detected in the second shared memory.

According to another aspect of the subject matter described in this application, a display apparatus for vehicle can include a first display and a second display implemented in a vehicle, a first signal processing device comprising a first processor configured to perform signal processing for the first display and the second display, and a second signal processing device comprising a second processor configured to perform signal processing for a third display. The first processor can be configured to execute first, second, and third virtual machines on a hypervisor in the first processor. The first virtual machine can configured to determine capability information or resource information of the second signal processing device, and operate, based on the capability information or the resource information of the second signal processing device, any one of the second signal processing device or the first signal processing device as a master signal processing device.

Implementations according to this aspect can include one or more of the following features. For example, capability information or resource information can be received from the second signal processing device.

In some implementations, the first virtual machine can be configured to determine whether resources of the second signal processing device are sharable based on the capability information or the resource information of the second signal processing device, and share, based on the resources being sharable, share at least some of processed data with the second signal processing device.

DETAILED DESCRIPTION

Figure 1A:
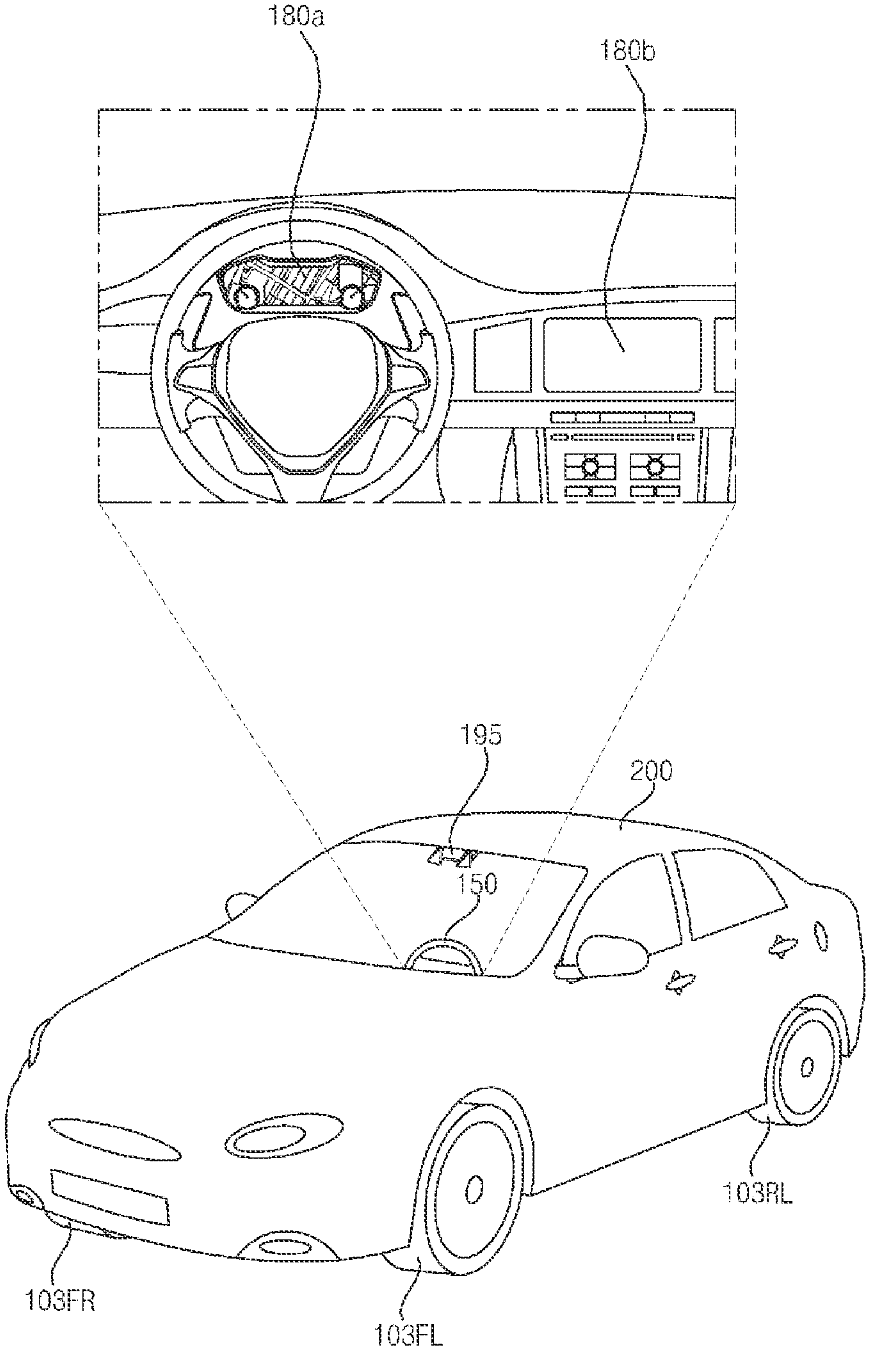
FIG. 1A is a diagram illustrating an example of the exterior and interior of a vehicle.

FIG. 1A is a diagram illustrating an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

In some implementations, the vehicle 200 can include a camera 195 configured to acquire an image of the front of the vehicle.

In some implementations, the vehicle 200 can be further provided therein with a plurality of displays 180*a* and 180*b* configured to display images and information.

In FIG. 1A, a cluster display 180*a* and an audio video navigation (AVN) display 180*b* are illustrated as the plurality of displays 180*a* and 180*b*. In addition, a head up display (HUD) can also be used.

In some implementations, the audio video navigation (AVN) display 180*b* can refer to a center information display.

For example, the display apparatus 100 for vehicle can include a plurality of displays 180*a* and 180*b* to divide data processing.

The vehicle 200 described in this specification can be a concept including all of a vehicle having an engine as a power source, a hybrid vehicle having an engine and an electric motor as a power source, and an electric vehicle having an electric motor as a power source.

Figure 1B:
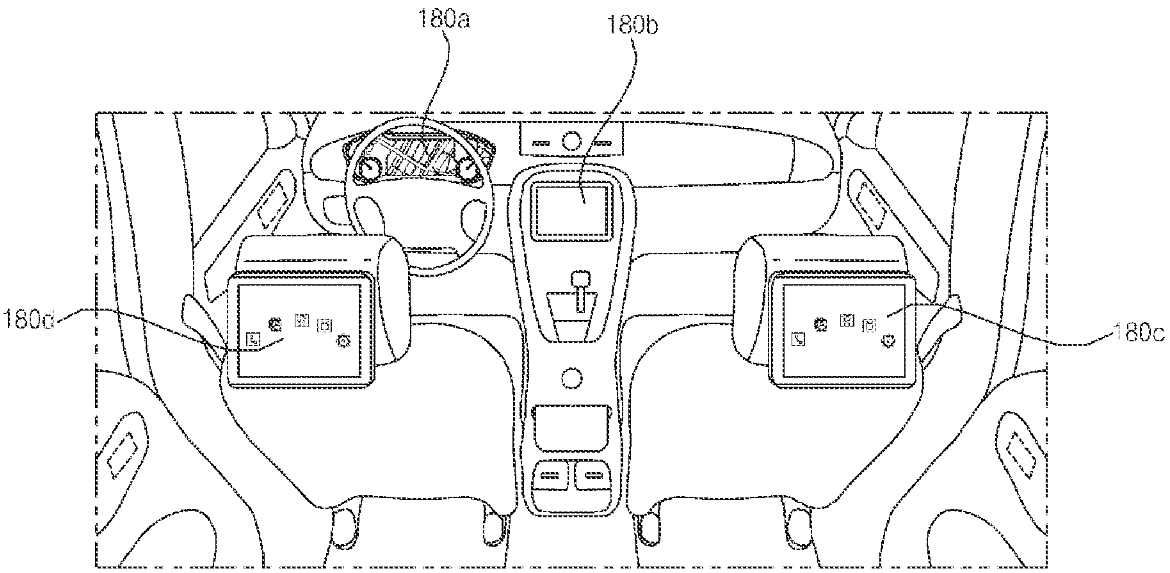
FIG. 1B is a diagram illustrating another example of the interior of the vehicle.

FIG. 1B is a diagram illustrating another example of the interior of the vehicle.

Referring to the figure, a cluster display 180*a*, an audio video navigation (AVN) display 180*b*, rear seat entertainment displays 180*c* and 180*d*, and a rear-view mirror display can be provided in the vehicle.

The display apparatus 100 for vehicle can include a plurality of displays 180*a* to 180*d* to divide data processing. This will be described with reference to FIG. 12 and subsequent figures.

Figure 2:
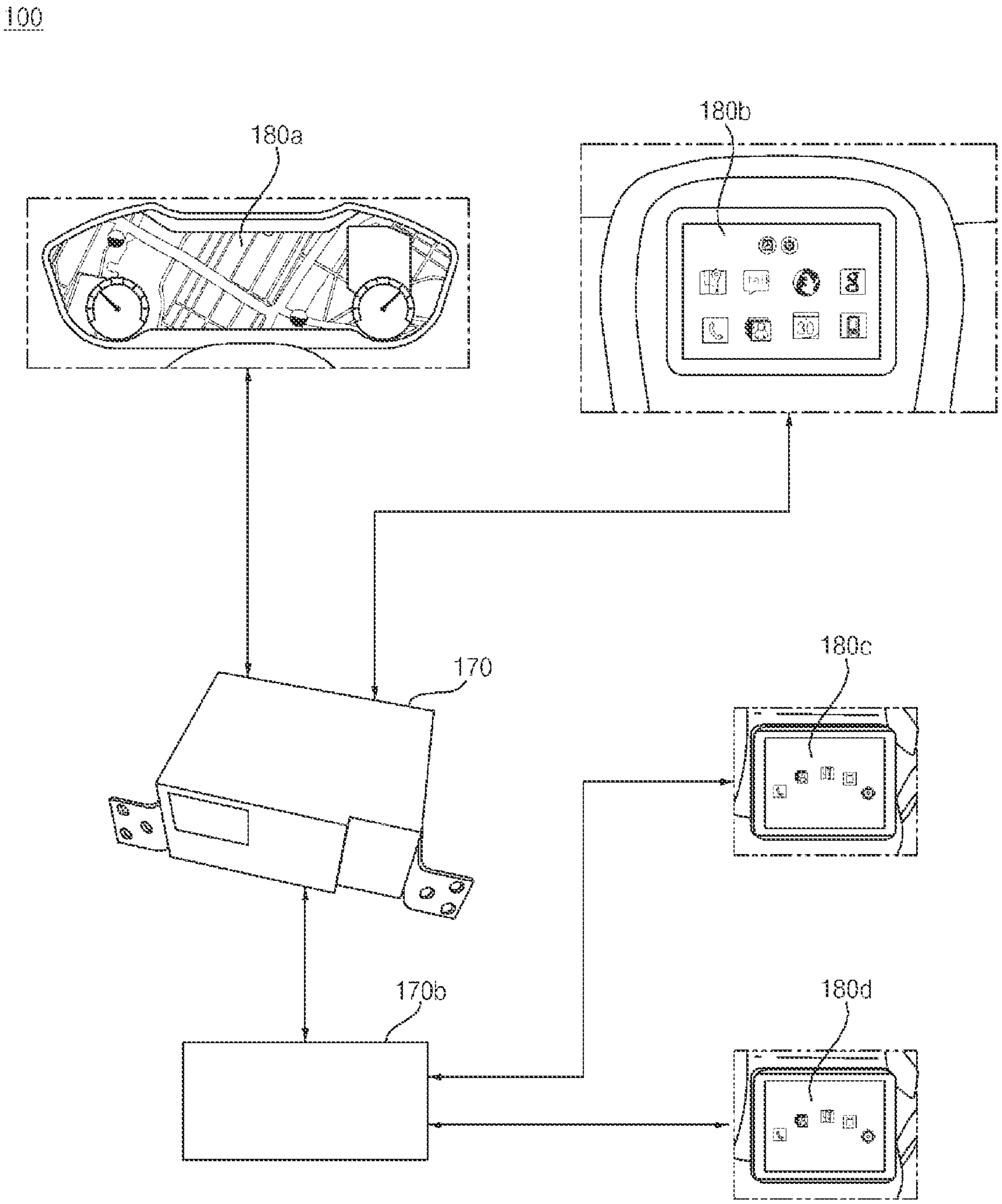
FIG. 2 is a diagram illustrating an example of an external appearance of a display apparatus for vehicle.

FIG. 2 is a diagram illustrating an example of the external appearance of a display apparatus for vehicle.

The display apparatus 100 for vehicle can include a plurality of displays 180*a* and 180*b*, a signal processing device 170 configured to perform signal processing in order to display images and information on the plurality of displays 180*a* and 180*b*, at least one display 180*c* and 180*d*, and a second signal processing device 170*b* configured to perform signal processing in order to display images and information on the at least one display 180*c* and 180*d*.

The signal processing device 170 and the second signal processing device 170*b* can be spaced apart from each other.

In some implementations, the second signal processing device 170*b* can be operated based on a different operating system (OS) than an OS of the signal processing device 170.

The first display 180*a*, which is one of the plurality of displays 180*a* and 180*b*, can be a cluster display 180*a* configured to display a driving state and operation information, and the second display 180*b* can be an audio video navigation (AVN) display 180*b* configured to display vehicle driving information, a navigation map, various kinds of entertainment information, or an image.

In the at least one display 180*c* and 180*d*, the third display 180*c* can be a right rear seat entertainment display of the vehicle, and the fourth display 180*d* can be a left rear seat entertainment display of the vehicle.

The at least one display 180*c* and 180*d* can display driving state information, simple navigation information, various kinds of entertainment information, or an image.

The signal processing device 170 can have a processor 175 provided therein, and first to third virtual machines 520 to 540 can be executed by a hypervisor 505 in the processor 175.

The first virtual machine 520 can correspond to a server virtual machine, and the second and third virtual machines can correspond to guest virtual machines.

Consequently, data communication can be performed between the first virtual machine 520 and the second or third virtual machine 530 or 540 according to a server interface and a client interface.

The second virtual machine 530 can be operated for the first display 180*a*, and the third virtual machine 540 can be operated for the second display 180*b*.

In some implementations, the first virtual machine 520 in the processor 175 shares at least some of data with the second virtual machine 530 and the third virtual machine 540 for divided processing of data. Consequently, the plurality of signal processing devices for the plurality of displays in the vehicle can divide and process data.

In some implementations, the first virtual machine 520 in the processor 175 can receive and process wheel speed sensor data of the vehicle, and can transmit the processed wheel speed sensor data to at least one of the second virtual machine 530, the third virtual machine 540, or the second signal processing device 170*b*. Consequently, at least one virtual machine can share the wheel speed sensor data of the vehicle.

In some implementations, the first virtual machine 520 in the processor 175 writes some of data in a first shared memory 508*a* to be transmitted to the second virtual machine 530, and writes some other of data in the first shared memory 508*a* to be transmitted to the third virtual machine 540. The second virtual machine 530 and the third virtual machine 540 can be configured to process the received data, and write the processed data in a second shared memory 508*b*. Consequently, the plurality of signal processing devices for the plurality of displays in the vehicle can divide and process data.

In some implementations, the first virtual machine 520 in the processor 175 can be configured to set a shared memory 508 based on the hypervisor 505 for transmission of the same data to the second virtual machine 530 and the third virtual machine 540. Consequently, the first display 180*a* and the second display 180*b* in the vehicle can display the same information or the same images in a synchronized state.

The signal processing device 170 can have the processor 175 therein, and can execute the first to third virtual machines 520 to 540 on the hypervisor 505 in the processor 175.

The first virtual machine 520 may correspond to a server virtual machine, and the second and third virtual machines may correspond to guest virtual machines.

Consequently, data communication can be performed between the first virtual machine 520 and the second or third virtual machine 530 or 540 according to the server interface and the client interface.

In some implementations, the second signal processing device 170*b* can have a second processor 175*b* therein, and can execute a server virtual machine 520*b* and a guest virtual machine 530*b* on a hypervisor 505*b* in the second processor 175*b*.

In some implementations, some of the plurality of displays 180*a* to 180*d* can be operated based on a Linux Operating System (OS), and others may be operated based on a Web Operating System (OS).

The signal processing device 170 and the second signal processing device 170*b* can divide and process data for the displays 180*a* to 180*d* configured to be operated under various operating systems.

In some implementations, the signal processing device 170 and the second signal processing device 170*b* can be configured to operate the displays 180*a* to 180*d* under various operating systems and also display the same information or the same images in a synchronized state.

In some implementations, the signal processing device 170 and the second signal processing device 170*b* can share at least some of data for divided processing of the data. Consequently, the plurality of signal processing devices for the plurality of displays in the vehicle can divide and process data. In addition, the plurality of signal processing devices can efficiently manage resources. For example, the signal processing device 170 can more efficiently manage resources by sharing data with the second signal processing device 170*b* for processing.

Figure 3:
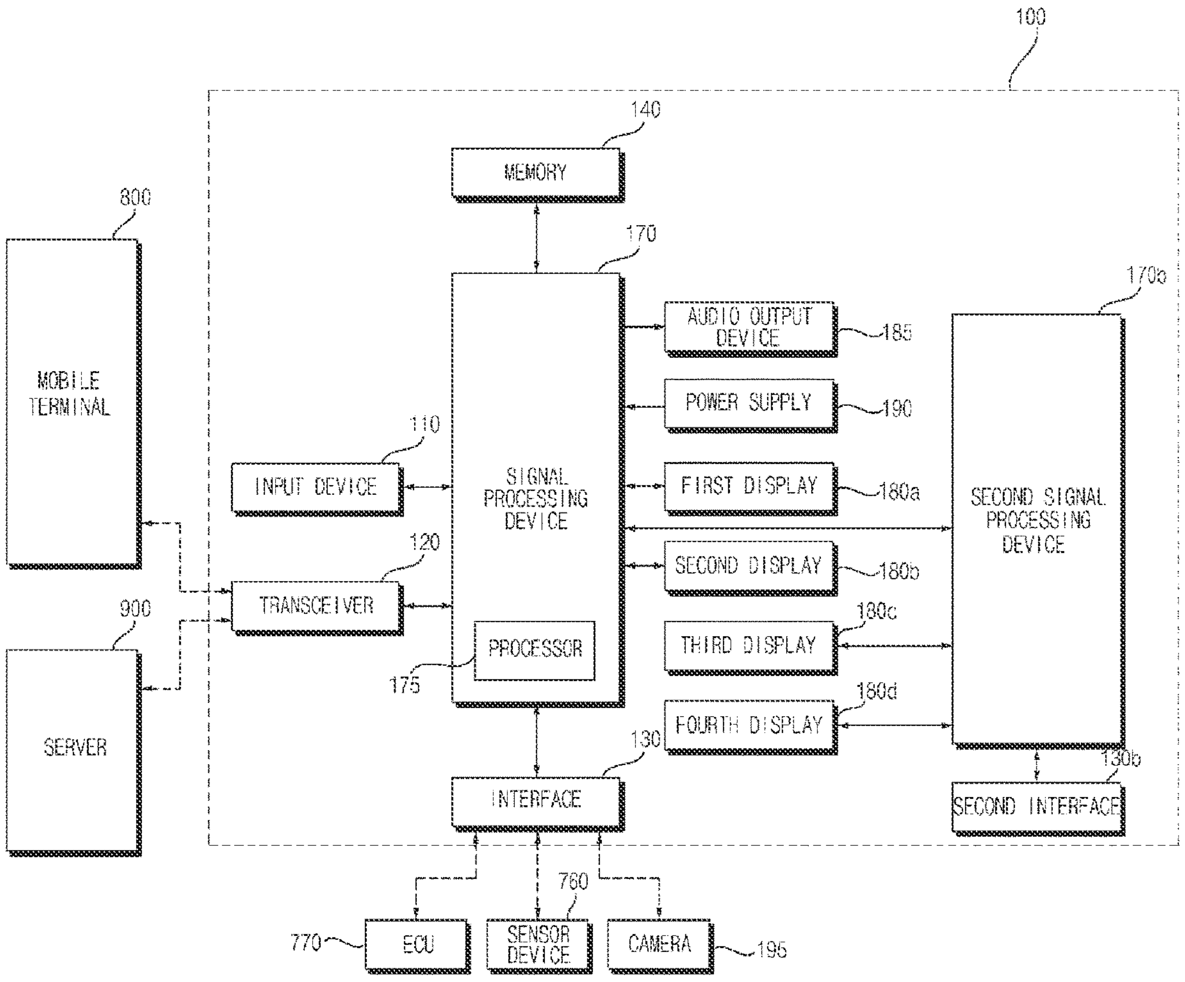
FIG. 3 is a diagram illustrating an example of an internal block diagram of the display apparatus for vehicle of FIG. 2.

FIG. 3 is a diagram illustrating an example of an internal block diagram of the display apparatus for vehicle.

Referring to FIG. 3, the display apparatus 100 for vehicle can include an input device 110, a transceiver 120, an interface 130, a second interface 130*b*, a memory 140, a signal processing device 170, a second signal processing device 170*b*, a plurality of displays 180*a* to 180*d*, an audio output device 185, and a power supply 190.

The input device 110 can include a physical button or pad for button input or touch input.

In some implementations, the input device 110 can include a microphone for user voice input.

The transceiver 120 can wirelessly exchange data with a mobile terminal 800 or a server 900.

In particular, the transceiver 120 can wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 can receive weather information and road traffic situation information, such as transport protocol expert group (TPEG) information, from the mobile terminal 800 or the server 900. In some implementations, the transceiver 120 can include a mobile communication module.

The interface 130 can receive sensor information from an electronic control unit (ECU) 770 or a sensor device 760, and can transmit the received information to the signal processing device 170.

The second interface 130*b* can receive sensor information from the electronic control unit (ECU) 770 or the sensor device 760, and can transmit the received information to the second signal processing device 170*b*.

In some implementations, the sensor information can include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information can be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. In some implementations, the position module can include a GPS module configured to receive GPS information.

In some implementations, the interface 130 can receive front-of-vehicle image data, side-of-vehicle image data, rear-of-vehicle image data, and obstacle-around-vehicle distance information from a camera 195 or LIDAR, and can transmit the received information to the signal processing device 170.

The memory 140 can store various data necessary for overall operation of the display apparatus 100 for vehicle, such as programs for processing or control of the signal processing device 170.

For example, the memory 140 can store data about the hypervisor and first to third virtual machines executed by the hypervisor in the processor 175.

The audio output device 185 can convert an electrical signal from the signal processing device 170 into an audio signal, and can output the audio signal. In some implementations, the audio output device 185 can include a speaker.

The power supply 190 can supply power necessary to operate components under control of the signal processing device 170. In particular, the power supply 190 can receive power from a battery in the vehicle.

The signal processing device 170 can control overall operation of each device in the display apparatus 100 for vehicle.

For example, the signal processing device 170 can include a processor 175 configured to perform signal processing for the displays 180*a* and 180*b*.

The processor 175 can execute the first to third virtual machines 520 to 540 on the hypervisor 505 (see FIG. 5) in the processor 175.

Among the first to third virtual machines 520 to 540 (see FIG. 5), the first virtual machine 520 can refer to a server virtual machine, and the second and third virtual machines 530 and 540 can refer to guest virtual machines.

The second virtual machine 530 can be operated for the first display 180*a*, and the third virtual machine 540 can be operated for the second display 180*b*.

For example, the first virtual machine 520 in the processor 175 can receive, process, and output vehicle sensor data, position information data, camera image data, audio data, or touch input data. Data processed only by a legacy virtual machine and data processed by the first virtual machine 520 can be distinguished from each other, whereby data processing can be efficiently performed. In particular, the first virtual machine 520 can process most of the data, whereby 1:N data sharing can be achieved.

In some implementations, the first virtual machine 520 can directly receive and process CAN communication data, audio data, radio data, USB data, and wireless communication data for the second and third virtual machines 530 and 540.

The first virtual machine 520 can transmit the processed data to the second and third virtual machines 530 and 540.

Consequently, only the first virtual machine 520, among the first to third virtual machines 520 to 540, may receive communication data and external input data, and can perform signal processing, whereby load in signal processing by the other virtual machines can be reduced and 1:N data communication can be achieved, and therefore synchronization at the time of data sharing can be achieved.

In some implementations, the first virtual machine 520 in the processor 175 writes some of data in the first shared memory 508*a* to be transmitted to the second virtual machine 530, and writes some other of data in the first shared memory 508*a* to be transmitted to the third virtual machine 540. The second virtual machine 530 and the third virtual machine 540 can be configured to process the received data, and write the processed data in the second shared memory 508*b*. Consequently, the plurality of signal processing devices for the plurality of displays in the vehicle can divide and process data.

In some implementations, data may be any one of image data, audio data, navigation data, or voice recognition data.

In some implementations, the first virtual machine 520 can process some other of data, and can be configured to write the processed data in the second shared memory 508*b*. For example, the first virtual machine 520 can perform data processing in addition to the second virtual machine 530 and the third virtual machine 540.

In some implementations, the first virtual machine 520 can create command queues for distributed processing of data in the second virtual machine 530 and the third virtual machine 540. Consequently, the plurality of virtual machines can divide and process data.

In some implementations, in response to the second virtual machine 530 and the third virtual machine 540 sharing the same data, the first virtual machine 520 in the processor 175 can create one command queue. Consequently, the same data can be synchronized and shared.

In some implementations, the first virtual machine 520 can create command queues corresponding to the number of virtual machines for distributed processing of data.

In some implementations, the first virtual machine 520 can be configured to transmit at least some of data to at least one of the second virtual machine 530, the third virtual machine 540, or the second signal processing device 170*b* for distributed processing of data.

For example, the first virtual machine 520 can allocate the first shared memory 508*a* for transmitting at least some of data to at least one of the second virtual machine 530, the third virtual machine 540, or the second signal processing device 170*b*, and image data processed by the second virtual machine 530 or the third virtual machine 540 can be written in the second shared memory 508*b*.

In some implementations, the first virtual machine 520 can be configured to write data in the shared memory 508, whereby the second virtual machine 530 and the third virtual machine 540 share the same data.

For example, the first virtual machine 520 can perform control such that radio data or wireless communication data are written in the shared memory 508, whereby the second virtual machine 530 and the third virtual machine 540 share the same data. Consequently, 1:N data sharing can be achieved.

In some implementations, the first virtual machine 520 can process most of the data, whereby 1:N data sharing can be achieved.

In some implementations, the first virtual machine 520 in the processor 175 can be configured to set the shared memory 508 based on the hypervisor 505 to transmit the same data to the second virtual machine 530 and the third virtual machine 540.

For example, the first virtual machine 520 in the processor 175 can transmit the same data to the second virtual machine 530 and the third virtual machine 540 in a synchronized state using the shared memory 508 based on the hypervisor 505. Consequently, the plurality of displays 180*a* and 180*b* in the vehicle can display the same images in a synchronized state.

In some implementations, the signal processing device 170 can process various signals, such as an audio signal, an image signal, and a data signal. For example, the signal processing device 170 can be implemented in the form of a system on chip (SOC).

The second signal processing device 170*b* can perform signal processing for the displays 180*c* and 180*d* for vehicle, and can include a second processor 175*b* to this end.

The second processor 175*b* can execute the server virtual machine 520*b* and the guest virtual machines 530*b* and 540*b* on the hypervisor 505*b* (FIG. 7) in the second processor 175*b*.

For example, the server virtual machine 520*b* in the second processor 175*b* can receive, process, and output vehicle sensor data, position information data, camera image data, audio data, or touch input data from the first virtual machine 520 in the processor 175 in the signal processing device 170.

In some implementations, the server virtual machine 520*b* can receive and process CAN communication data, audio data, radio data, USB data, and wireless communication data from the first virtual machine 520 in the processor 175 in the signal processing device 170 for the guest virtual machines 530*b* and 540*b*.

The server virtual machine 520*b* can transmit the processed data to the guest virtual machines 530*b* and 540*b*.

Consequently, only the server virtual machine 520*b*, among the server virtual machine 520*b* and the guest virtual machines 530*b* and 540*b*, can receive communication data and external input data, and can perform signal processing, whereby signal processing load of the guest virtual machines 530*b* and 540*b* can be reduced and 1:N data communication can be achieved, and therefore synchronization at the time of data sharing can be achieved.

In some implementations, the server virtual machine 520*b* writes some of data in the shared memory 508*a* to be transmitted to the guest virtual machine 530*b*, and the guest virtual machines 530*b* and 540*b* can process the received data, and can be configured to write the processed data in the shared memory 508*b*. Consequently, the plurality of signal processing devices for the plurality of displays in the vehicle can divide and process data.

In some implementations, data may be any one of image data, audio data, navigation data, and voice recognition data.

In some implementations, the server virtual machine 520*b* can create command queues for distributed processing of data in the second virtual machine 530 and the third virtual machine 540. Consequently, the plurality of virtual machines can divide and process data.

In some implementations, in response to the second virtual machine 530 and the third virtual machine 540 sharing the same data, the server virtual machine 520*b* in the second processor 175*b* can create one command queue. Consequently, the same data can be synchronized and shared.

In some implementations, the server virtual machine 520*b* can create command queues corresponding to the number of virtual machines for distributed processing of data.

In some implementations, the server virtual machine 520*b* can be configured to transmit at least some of data to at least one of the guest virtual machines 530*b* and 540*b* for distributed processing of data.

For example, the server virtual machine 520*b* can allocate the shared memory 508*a* for transmitting at least some of data to at least one of the guest virtual machines 530*b* and 540*b*, and image data processed by the guest virtual machine 530*b* or the guest virtual machine 540*b* can be written in the shared memory 508*b*.

In some implementations, the server virtual machine 520*b* can be configured to write data in the shared memory 508*b*, whereby the guest virtual machines 530*b* and 540*b* share the same data.

For example, the server virtual machine 520*b* can be configured to write radio data or wireless communication data in the shared memory 508*b*, whereby the guest virtual machines 530*b* and 540*b* share the same data. Consequently, 1:N data sharing can be achieved.

In some implementations, the server virtual machine 520*b* can process most of the data, whereby 1:N data sharing can be achieved.

In some implementations, the server virtual machine 520*b* in the second processor 175*b* can be configured to set the shared memory 508*b* based on the hypervisor 505*b* to transmit the same data to the guest virtual machines 530*b* and 540*b*.

For example, the server virtual machine 520*b* in the second processor 175*b* can transmit the same data to the guest virtual machines 530*b* and 540*b* in a synchronized state using the shared memory 508*b* based on the hypervisor 505*b*. Consequently, the plurality of displays 180*a* to 180*d* in the vehicle can display the same images in a synchronized state.

In some implementations, the second signal processing device 170*b* can process various signals, such as an audio signal, an image signal, and a data signal. For example, the second signal processing device 170*b* can be implemented in the form of a system on chip (SOC).

Figure 4:
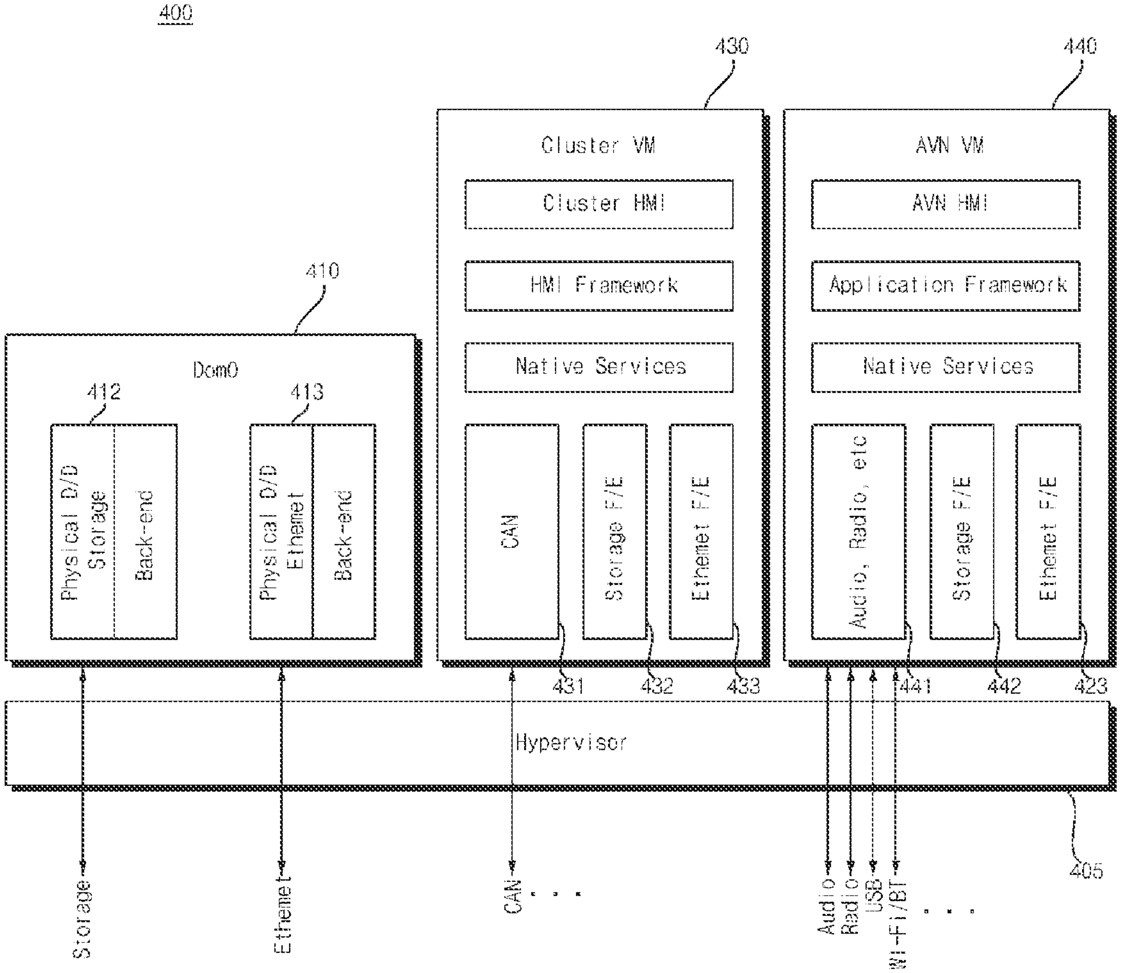
FIG. 4 is a diagram illustrating an example of a system driven in a signal processing device.

FIG. 4 is a diagram illustrating an example of a system driven in a signal processing device.

Referring to FIG. 4, FIG. 4 illustrates that virtual machines are used for the cluster display 180*a* and the AVN display 180*b*.

The system 400 driven in the signal processing device of FIG. 4 illustrates that a cluster virtual machine 430 and an AVN virtual machine 440 can be executed on a hypervisor 405 in the processor 175 in the signal processing device 170.

In some implementations, the system 400 driven in the signal processing device of FIG. 4 illustrates that a legacy virtual machine 410 can also be executed on the hypervisor 405 in the processor 175.

The legacy virtual machine 410 can include an interface 412 for data communication with the memory 140 and an interface 413 for Ethernet communication.

In some implementations, the cluster virtual machine 430 can include an interface 431 for CAN communication, an interface 432 for communication with the interface 412 of the legacy virtual machine 410, and an interface 433 for communication with the interface 413 of the legacy virtual machine 410.

In some implementations, the AVN virtual machine 440 can include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there may be a disadvantage in that CAN communication data are input and output only in the cluster virtual machine 430, whereby the CAN communication data cannot be utilized in the AVN virtual machine 440.

Also, in the system 400 of FIG. 4, there may be a disadvantage in that audio data, radio data, USB data, and wireless communication data are input and output only in the AVN virtual machine 440, whereby these data cannot be utilized in the cluster virtual machine 430.

Further, there is a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. For example, unlike FIG. 4, virtual machines are classified into a server virtual machine and guest virtual machines such that various memory data and communication data are input and output not in the guest virtual machines but in the server virtual machine. This will be described with reference to FIG. 5 and subsequent figures.

Figure 5:
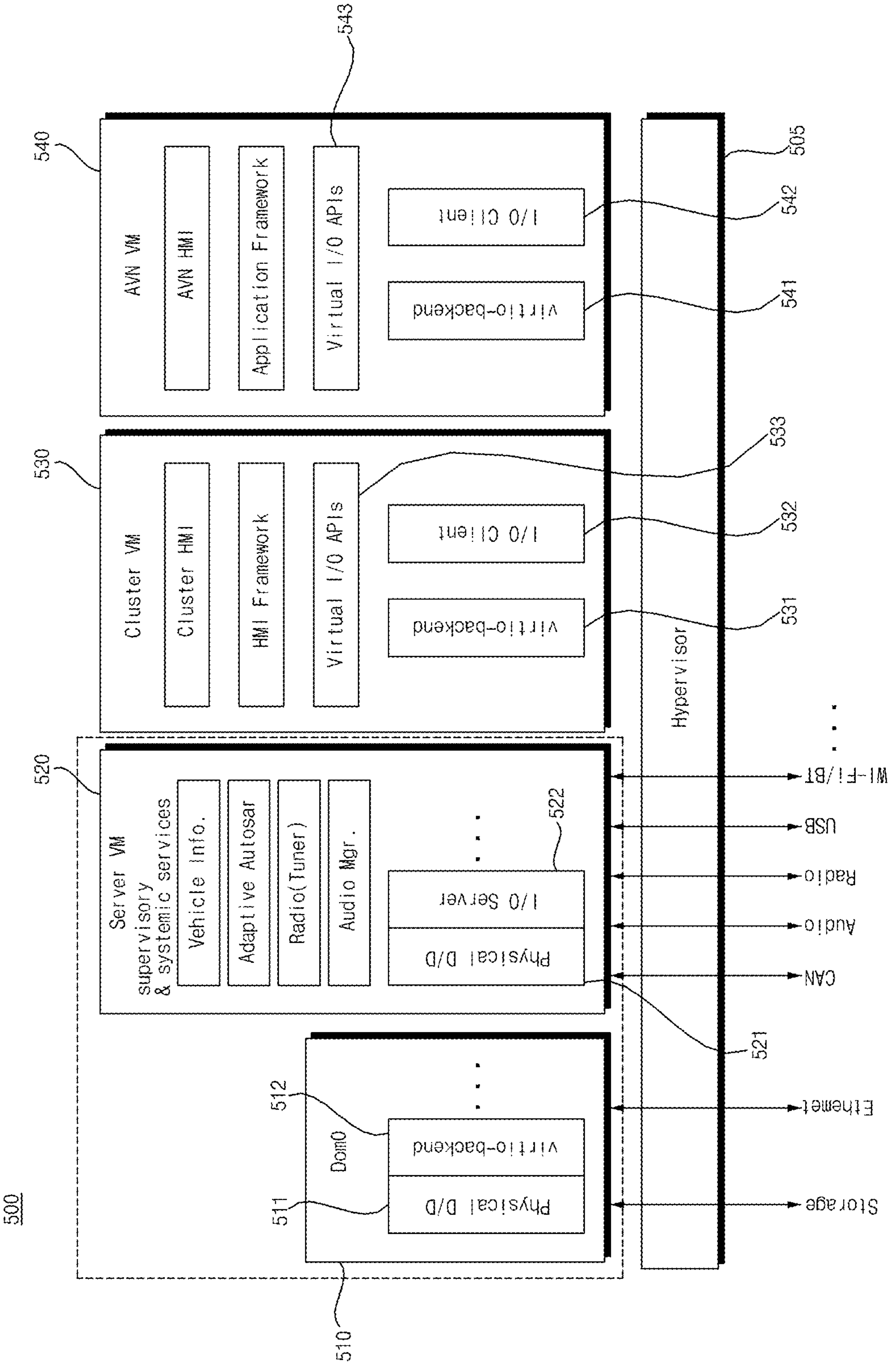
FIG. 5 is a diagram illustrating another example of a system driven in a signal processing device.

FIG. 5 is a diagram illustrating another example of a system driven in a signal processing device.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, can be executed on the hypervisor 505 in the processor 175 of the signal processing device 170.

The second virtual machine 530 can be a virtual machine for the cluster display 180*a*, and the third virtual machine 540 can be a virtual machine for the AVN display 180*b*.

For example, the second virtual machine 530 and the third virtual machine 540 can be operated for image rendering of the cluster display 180*a* and the AVN display 180*b*, respectively.

In some implementations, the system 500 driven in the signal processing device 170 of FIG. 5 illustrates that a legacy virtual machine 510 can also be executed on the hypervisor 505 in the processor 175.

The legacy virtual machine 510 can include an interface 511 for data communication with the memory 140 and Ethernet communication.

In some implementations, the legacy virtual machine 510 can further include a virtual input and output device backend (virtio-backend) interface 512 for data communication with the second and third virtual machines 530 and 540. The virtio is a standardized interface which allows virtual machines access to simplified virtual devices.

The first virtual machine 520 can include an interface 521 for input and output of audio data, radio data, USB data, and wireless communication data and an input and output server interface 522 for data communication with the guest virtual machines.

For example, the first virtual machine 520, which is a server virtual machine, can provide inputs/outputs (I/O) difficult to virtualize with standard virtualization technology (VirtIO) to a plurality of guest virtual machines, such as the second and third virtual machines 530 and 540.

In some implementations, the first virtual machine 520, which is a server virtual machine, can control radio data and audio data at a supervisor level, and can provide the data to a plurality of guest virtual machines, such as the second and third virtual machines 530 and 540.

In some implementations, the first virtual machine 520, which is a server virtual machine, can process vehicle data, sensor data, and surroundings-of-vehicle information, and can provide the processed data or information to a plurality of guest virtual machines, such as the second and third virtual machines 530 and 540.

In some implementations, the first virtual machine 520 can provide supervisory services, such as processing of vehicle data and audio routing management.

The second virtual machine 530 can include an input and output client interface 532 for data communication with the first virtual machine 520 and APIs 533 configured to control the input and output client interface 532.

In addition, the second virtual machine 530 can include a virtio-backend interface 531 for data communication with the legacy virtual machine 510.

The second virtual machine 530 can receive memory data by communication with the memory 140 and Ethernet data by Ethernet communication from the virtio-backend interface 512 of the legacy virtual machine 510 through the virtio-backend interface.

The third virtual machine 540 can include an input and output client interface 542 for data communication with the first virtual machine 520 and APIs 533 configured to control the input and output client interface 542.

In addition, the third virtual machine 540 can include a virtio-backend interface 541 for data communication with the legacy virtual machine 510.

The third virtual machine 540 can receive memory data by communication with the memory 140 and Ethernet data by Ethernet communication from the virtio-backend interface 512 of the legacy virtual machine 510 through the virtio-backend interface 541.

In some implementations, the legacy virtual machine 510 can be provided in the first virtual machine 520.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 can be achieved.

In addition or alternatively, in the system 500 of FIG. 5, audio data, radio data, USB data, and wireless communication data may be input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 can be achieved.

In some implementations, in the system 500 of FIG. 5, the second and third virtual machines 530 and 540 can be operated based on different operating systems.

For example, the second virtual machine 530 can be operated based on a Linux OS, and the third virtual machine 540 can be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, the same data or the same images can be shared in a synchronized state. Thus, the plurality of displays 180*a* and 180*b* can display the same data or the same images in a synchronized state.

Figure 6:
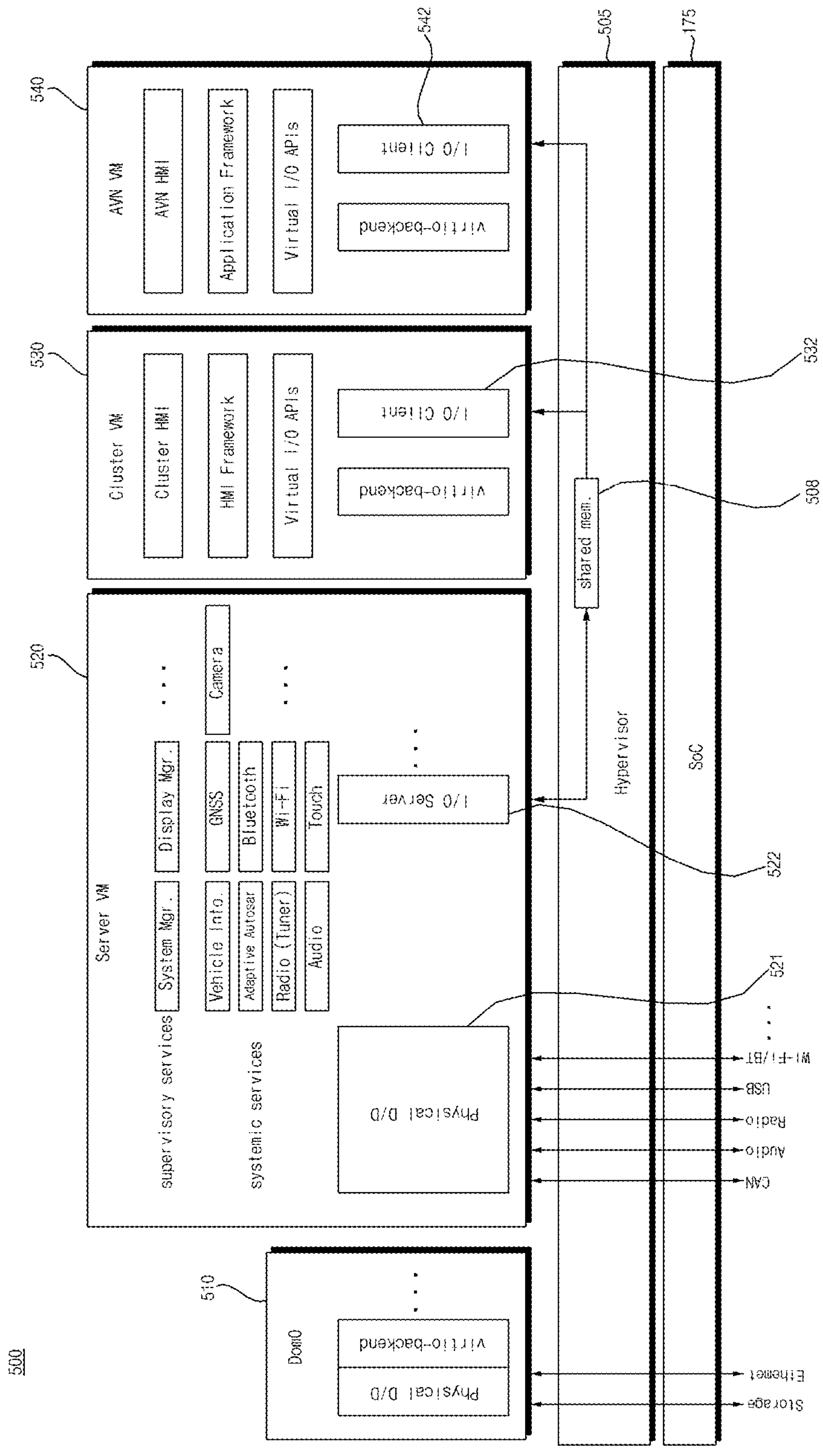
FIG. 6 is a diagram describing an operation of the system driven in the signal processing device.

FIG. 6 is a diagram describing an operation of the system driven in the signal processing device.

Referring to the figure, the processor 175 in the signal processing device 170 can execute the first to third virtual machines 520 to 540 on the hypervisor 505 in the processor 175, and the first virtual machine 520 in the processor 175 can be configured to set the shared memory 508 based on the hypervisor 505 for transmission of the same data to the second and third virtual machines 530 and 540.

For example, the same image data may be illustrated as the same data. Consequently, the plurality of displays 180*a* and 180*b* in the vehicle can display the same images in a synchronized state.

In some implementations, in the system 500 of FIG. 6, the processor 175 in the signal processing device 170 can execute the first to third virtual machines 520 to 540 on the hypervisor 505 in the processor 175, and the first virtual machine 520 in the processor 175 can transmit the same data to the second and third virtual machines 530 and 540 in a synchronized state using the shared memory 508 based on the hypervisor 505.

For example, CAN communication data, audio data, radio data, USB data, wireless communication data, position information data, or touch data can be illustrated as the same data. Consequently, the plurality of displays 180*a* and 180*b* in the vehicle can display the same data in a synchronized state.

In some implementations, the legacy virtual machine 510 can transmit memory data from the memory 140 and Ethernet data by Ethernet communication to the second and third virtual machines 530 and 540 in a synchronized state using the shared memory 508 based on the hypervisor 505. For example, it is possible to perform 1:N data communication with respect to the memory data or the Ethernet data, whereby it is possible to transmit the same data in a synchronized state.

Figure 7:
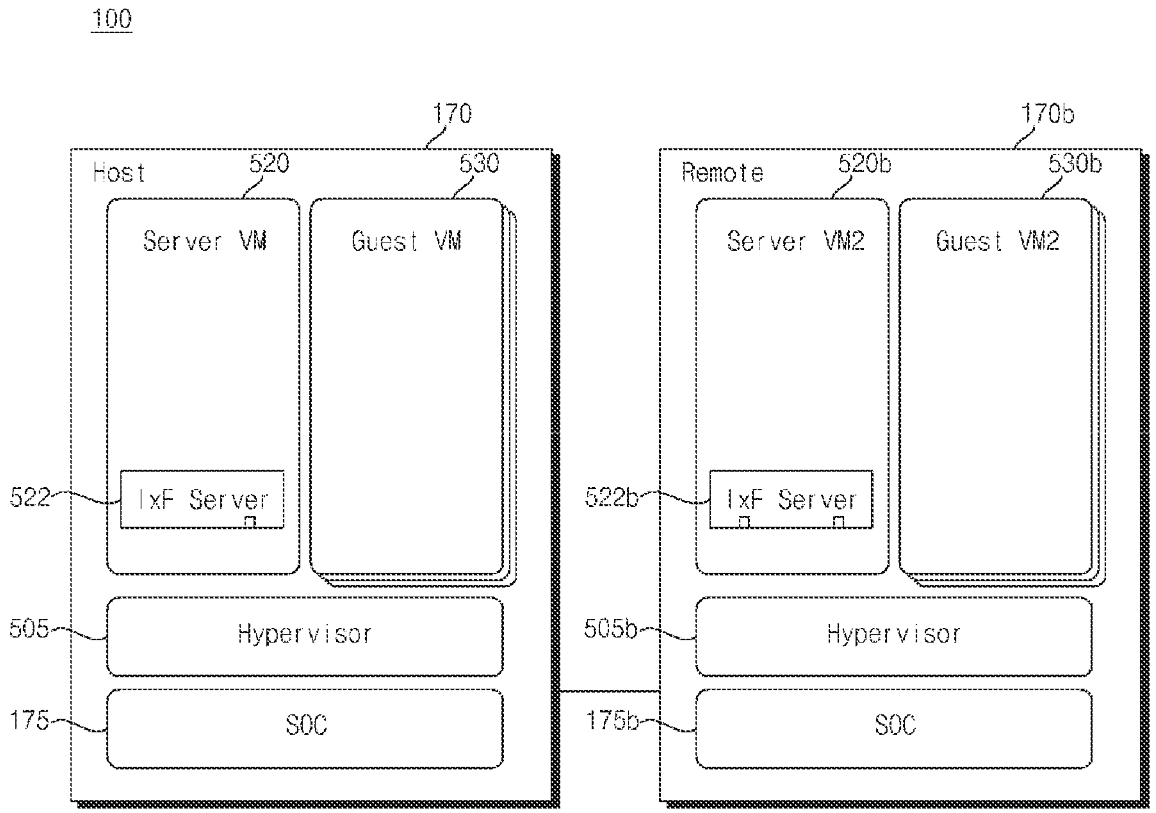
FIG. 7 is a diagram illustrating an example of a system driven in the display apparatus for vehicle.

FIG. 7 is a diagram illustrating an example of a system driven in the display apparatus for vehicle.

Referring to FIG. 7, the display apparatus 100 for vehicle can include a signal processing device 170 including a processor 175 configured to perform signal processing for a first display 180*a* and a second display 180*b* and a second signal processing device 170*b* including a second processor 175*b* configured to perform signal processing for a third display 180*c*.

The processor 175 in the signal processing device 170 can execute first to third virtual machines 520 to 540 on a hypervisor 505 in the processor 175.

In some implementations, the second virtual machine 530, which is a guest virtual machine, is operated for the first display 180*a*, the third virtual machine 540, which is a guest virtual machine, is operated for the second display 180*b*, and the first virtual machine 520 is operated as a server virtual machine.

In some implementations, the first virtual machine 520 in the processor 175 can receive and process wheel speed sensor data of the vehicle, and can transmit the processed wheel speed sensor data to at least one of the second virtual machine 530 or the third virtual machine 540 or the second signal processing device 170*b*. Consequently, at least one virtual machine or the second signal processing device 170*b* can share the wheel speed sensor data of the vehicle.

In FIG. 7, the signal processing device 170 is shown as a host signal processing device, and the second signal processing device 170*b* is shown as a remote signal processing device. However, the present disclosure is not limited thereto.

In some implementations, in response to the signal processing device 170 being operated as a master signal processing device, the first virtual machine 520 in the processor 175 shares at least some of data with the second signal processing device 170*b* for divided processing of data.

For example, the first virtual machine 520 in the processor 175 can drive an input and output server interface 522.

Consequently, the plurality of signal processing devices for the plurality of displays in the vehicle can divide and process data. In addition, the plurality of signal processing devices can efficiently manage resources.

In addition, high-speed data communication can be performed between the plurality of virtual machines or the plurality of signal processing devices 170 and 170*b*. Furthermore, high-speed data communication can be performed even though the plurality of virtual machines or the plurality of signal processing devices 170 and 170*b* are driven by different operating systems.

For example, the first virtual machine 520 in the processor 175 may check capability information or resource information of the second signal processing device 170*b*, and can be configured to operate any one of the second signal processing device 170*b* and the signal processing device 170 as a master signal processing device 170 based on the capability information or resource information of the second signal processing device 170*b*. Consequently, the master signal processing device 170 can be set from among the plurality of signal processing devices, whereby data processing can be efficiently performed.

In some implementations, as depicted in FIG. 7, a hypervisor 505*b* can be driven on the second processor 175*b* in the second signal processing device 170*b*, a server virtual machine 520*b* and a guest virtual machine 530*b* can be driven on the hypervisor 505*b*, and an input and output server interface 522*b* can be driven in the server virtual machine 520*b*. In some implementations, the virtual machines may not be driven.

In some implementations, the first virtual machine 520 in the processor 175 can be configured to operate the signal processing device 170, which is one of the second signal processing device 170*b* and the signal processing device 170, as a master signal processing device 170. Consequently, data processing can be efficiently performed.

In some implementations, the second signal processing device 170*b*, not the signal processing device 170, can be operated as a master signal processing device, and the signal processing device 170 can be operated as a slave signal processing device.

For example, in response to the second signal processing device 170*b* being operated as a master signal processing device 170, the server virtual machine 520*b* in the second processor 175*b* can share at least some of data with the signal processing device 170 for divided processing of data. Consequently, the master signal processing device 170 can be set from among the plurality of signal processing devices, whereby data processing can be efficiently performed.

In some implementations, a display apparatus 100 for vehicle can include a signal processing device 170 including a processor 175 configured to perform signal processing for a first display 180*a* and a second display 180*b* and a second signal processing device 170*b* including a second processor 175*b* configured to perform signal processing for a third display 180*c*.

In some implementations, the processor 175 in the signal processing device 170 can execute first to third virtual machines 520 to 540 on a hypervisor 505 in the processor 175.

In some implementations, the first virtual machine 520 in the processor 175 may check capability information or resource information of the second signal processing device 170*b*, and can be configured to operate any one of the second signal processing device 170*b* and the signal processing device 170 as a master signal processing device 170 based on the capability information or resource information of the second signal processing device 170*b*. Consequently, any one of the plurality of signal processing devices 170 and 170*b* can be set as a master signal processing device, whereby data processing can be efficiently performed.

Figure 8:
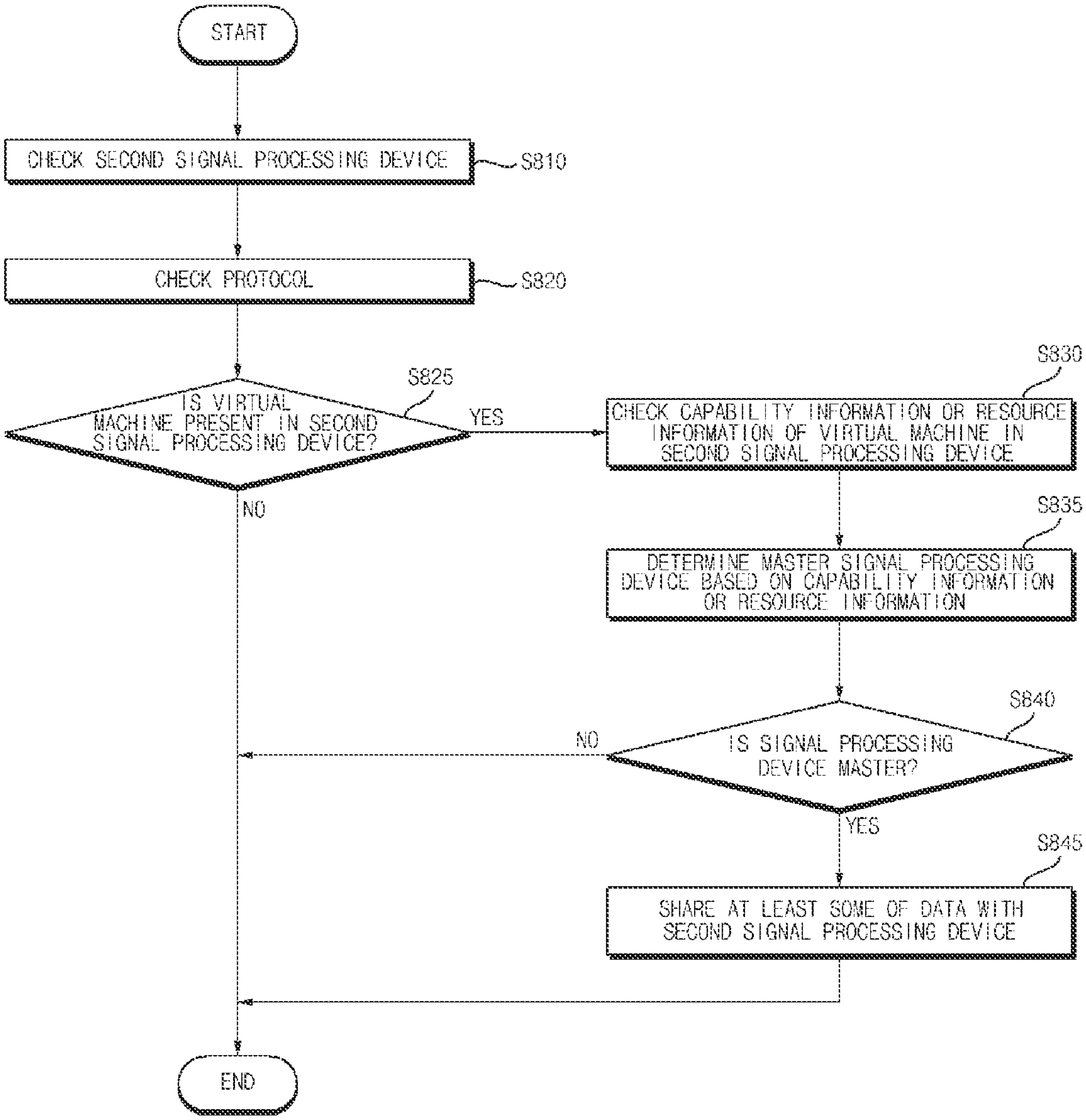
FIG. 8 is a flowchart illustrating an operation method of the display apparatus for vehicle.

FIG. 8 is a flowchart illustrating an operation method of the display apparatus for vehicle, and FIGS. 9A to 19 are diagrams referred to in the description of FIG. 8.

Referring to FIG. 8, the signal processing device 170 may check the second signal processing device 170*b* (S810).

For example, the first virtual machine 520 in the processor 175 in the signal processing device 170 may check the second signal processing device 170*b*.

The signal processing device 170 and the second signal processing device 170*b* can be connected to each other in a wired or wireless manner.

For example, in response to connection being performed in a wired manner, an interface scheme between the signal processing device 170 and the second signal processing device 170*b* can be a high-speed interface scheme, such as Ethernet, CCIX based on USB or PCI express (PCIe), NvLink, or CXL.

Subsequently, the processor 175 in the signal processing device 170 may check an interface protocol of the second signal processing device 170*b* (S820).

For example, the first virtual machine 520 in the processor 175 in the signal processing device 170 may check an interface protocol of the second signal processing device 170*b*.

Figure 9A:
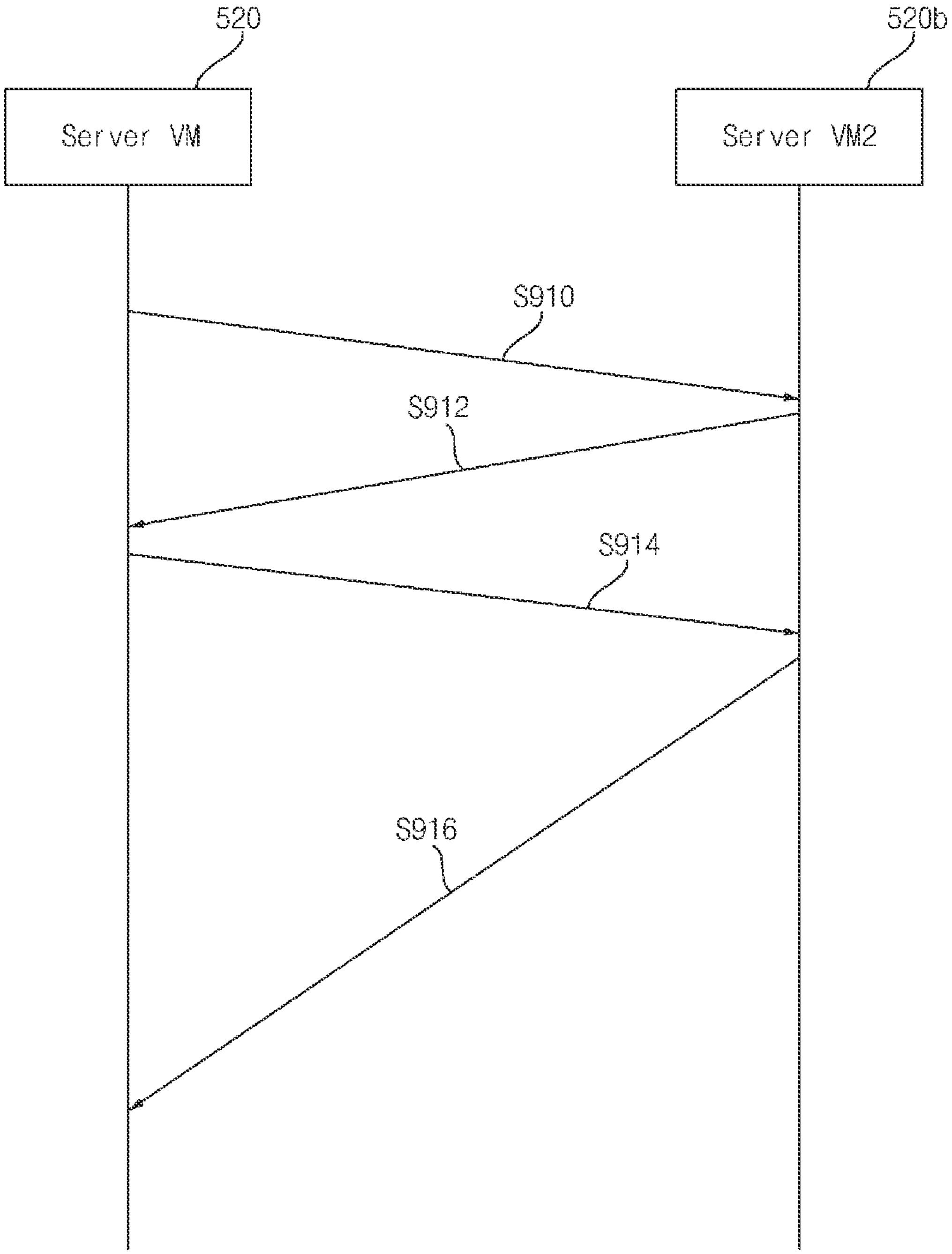
FIGS. 9A to 19 are diagrams referred to in the description of FIG. 8.
Figure 9B:
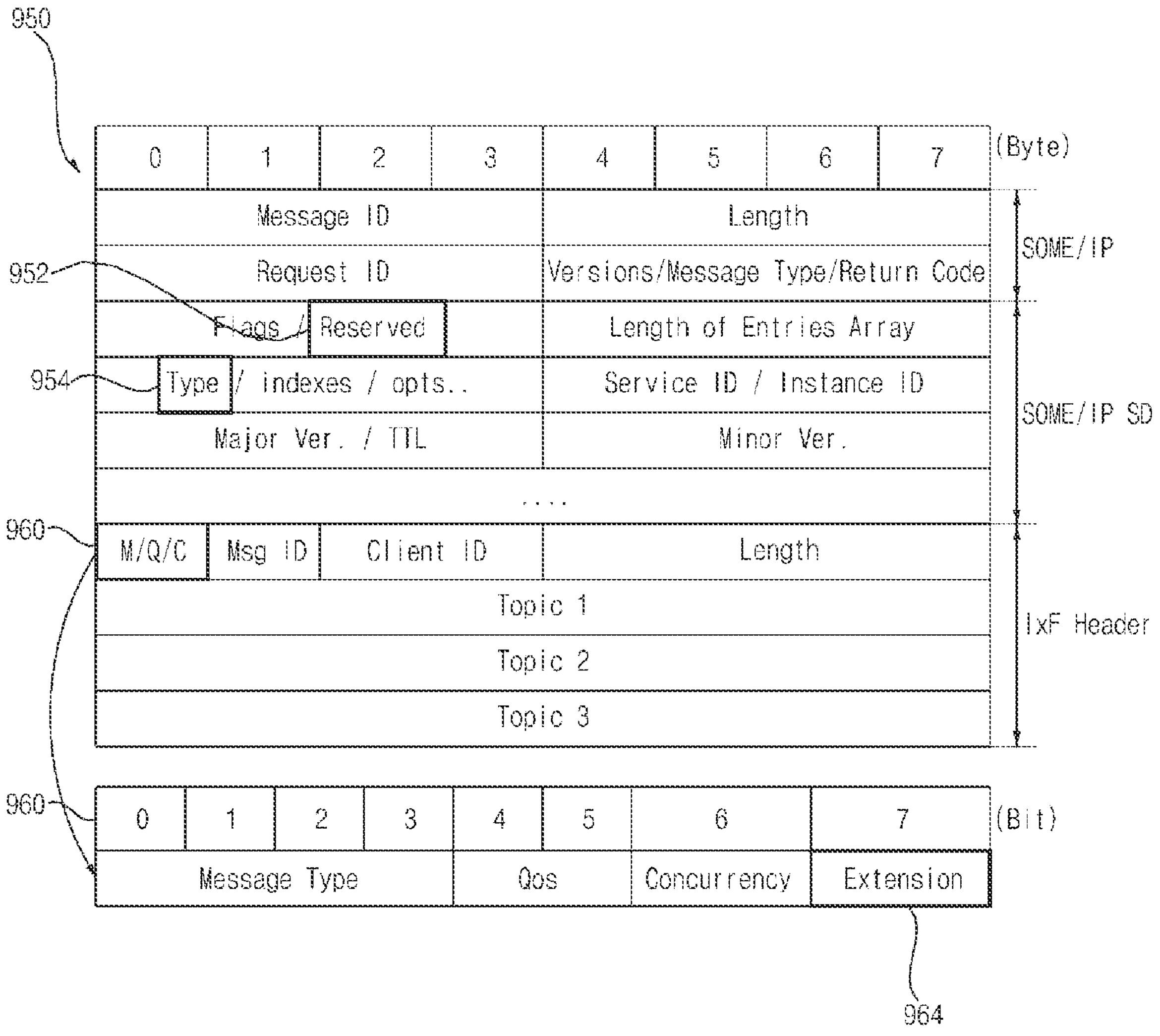

FIG. 9B is a diagram illustrating an example of an interface protocol 950 between the signal processing device 170 and the second signal processing device 170*b*.

Referring to FIG. 9B, the interface protocol 950, which is a Service-Oriented Architecture (SOA) interworking protocol, can include SOME/IP, SOME/IP SD, and an interface header.

In some implementations, reserved information 952 and type information 954 in the SOME/IP SD and an extension bit 964 in M/Q/C information 960 in the interface header can be utilized in order to check performance of the second signal processing device 170*b*.

For example, in response to the reserved information 952 being [0x00], this indicates Find Server VM. In response to the reserved information 952 being [0x01], this indicates Offer Server VM. In response to the reserved information 952 being [0x02], this indicates Request capability. In response to the reserved information 952 being [0x03], this indicates Request capability ACK.

In some implementations, in response to the type information 954 being [0x00], this indicates Find Service. In response to the type information 954 being [0x01], this indicates Offer Service. In response to the type information 954 being [0x02], this indicates Request Service. In response to the type information 954 being [0x03], this indicates Request Service ACK. In response to the type information 954 being [0x04], this indicates Find Event group. In response to the type information 954 being [0x05], this indicates Publish Event group. In response to the type information 954 being [0x06], this indicates Subscribe Event group. In response to the type information 954 being [0x07], this indicates Subscribe Event group ACK.

In some implementations, in response to the extension bit 964 being [0x00], this indicates only IxF. In response to the extension bit 964 being [0x01], this indicates IxF with SOME/IP.

In some implementations, the first virtual machine 520 in the processor 175 in the signal processing device 170 can determine whether a virtual machine is present in the second signal processing device 170*b* and the virtual machine is driven through the received interface protocol 950 (S825).

Upon determining that a virtual machine is present in the second signal processing device 170*b* (S825), the first virtual machine 520 in the processor 175 in the signal processing device 170 may check capability information or resource information of the virtual machine in the second signal processing device 170*b* (S830).

For example, the second signal processing device 170*b* can transmit capability information or resource information of the virtual machine in the second signal processing device 170*b* to the signal processing device 170.

Subsequently, the first virtual machine 520 in the processor 175 in the signal processing device 170 can determine one of the signal processing device 170 and the second signal processing device 170*b* to be a master signal processing device based on the received capability information or resource information of the virtual machine in the second signal processing device 170*b* (S835).

For example, in response to the capability information of the virtual machine in the second signal processing device 170*b* being lower in level than the capability information of the virtual machine in the signal processing device 170, the signal processing device 170 can be determined to be a master signal processing device.

By way of further example, in response to the capability information of the virtual machine in the second signal processing device 170*b* being higher in level than the capability information of the virtual machine in the signal processing device 170, the second signal processing device 170*b* can be determined to be a master signal processing device.

As yet another example, in response to available resource information of the virtual machine in the second signal processing device 170*b* being lower in level than available resource information of the virtual machine in the signal processing device 170, the signal processing device 170 can be determined to be a master signal processing device.

As a further example, in response to the available resource information of the virtual machine in the second signal processing device 170*b* being higher in level than the available resource information of the virtual machine in the signal processing device 170, the second signal processing device 170*b* can be determined to be a master signal processing device.

In some implementations, the first virtual machine 520 in the processor 175 may check whether the server virtual machine 520*b* in the second signal processing device 170*b* is driven based on protocol information received from the outside, and, in response to the server virtual machine 520*b* in the second signal processing device 170*b* being not driven, can be configured to operate the signal processing device 170 as a master signal processing device 170. Consequently, any one of the plurality of signal processing devices 170 and 170*b* can be set as a master signal processing device, whereby data processing can be efficiently performed.

Subsequently, in response to the signal processing device 170 being a master signal processing device (S840), the first virtual machine 520 in the processor 175 in the signal processing device 170 can share at least some of data with the second signal processing device 170*b* (S845).

Consequently, the plurality of signal processing devices 170 and 170*b* for the plurality of displays in the vehicle can divide and process data. In addition, the plurality of signal processing devices 170 and 170*b* can efficiently manage resources.

In some implementations, the first virtual machine 520 in the processor 175 in the signal processing device 170 can acquire available resource information, such as CPU, GPU, and NPU, of the second signal processing device 170*b*, and can reallocate resources in the signal processing device 170 and the second signal processing device 170*b*.

For example, the first virtual machine 520 in the processor 175 in the signal processing device 170 can reallocate resources in the signal processing device 170 and the second signal processing device 170*b* such that the difference in level of the available information between the signal processing device 170 and the second signal processing device 170*b* is reduced. Consequently, the plurality of signal processing devices 170 and 170*b* can efficiently manage resources.

In some implementations, the first virtual machine 520 in the processor 175 in the signal processing device 170 may check whether resources of the second signal processing device 170*b* are sharable based on the capability information or the resource information of the second signal processing device 170*b*, and, in response to the resources being sharable, can share at least some of processed data with the second signal processing device 170*b*. Consequently, the plurality of signal processing devices 170 and 170*b* can efficiently manage resources.

In some implementations, the first virtual machine 520 in the processor 175 in the signal processing device 170 may check whether resources of the second signal processing device 170*b* are distributable or sharable, and, in response to the resources being distributable or sharable, can reallocate resources in the signal processing device 170 and the second signal processing device 170*b*. Consequently, the plurality of signal processing devices 170 and 170*b* can efficiently manage resources.

In some implementations, the first virtual machine 520 in the processor 175 in the signal processing device 170 may check whether resources of the second signal processing device 170*b* are distributable or sharable, and, in response to the resources being not distributable or sharable, can reallocate resources in only the guest virtual machines 530 and 540 in the signal processing device 170. Consequently, the signal processing device 170, not the second signal processing device 170*b*, can efficiently manage resources.

FIG. 9A is a diagram illustrating an example of exchange of capability information or resource information between the first virtual machine 520 in the signal processing device 170 and the server virtual machine 520*b* in the second signal processing device 170*b*.

Referring to FIG. 9A, the first virtual machine 520 in the processor 175 in the signal processing device 170 can set the reserved information 952 in the interface protocol 950 to [0x00] and can transmit the interface protocol 950 to the second signal processing device 170*b* (S910).

In response thereto, the server virtual machine 520*b* in the second signal processing device 170*b* can set the reserved information 952 in the interface protocol 950 to [0x01] and can transmit the interface protocol 950 to the signal processing device 170 (S912).

In response to the reserved information 952 in the received interface protocol 950 being [0x01], the first virtual machine 520 in the processor 175 in the signal processing device 170 can determine that a virtual machine is present in the second signal processing device 170*b*.

In some implementations, in response to the reserved information 952 in the received interface protocol 950 being not [0x01] or the interface protocol 950 not being received, the first virtual machine 520 in the processor 175 in the signal processing device 170 can determine that no virtual machine is present in the second signal processing device 170*b*.

Subsequently, in order to check the capability information of the second signal processing device 170*b*, the first virtual machine 520 in the processor 175 in the signal processing device 170 can set the reserved information 952 in the interface protocol 950 to [0x02] and can transmit the interface protocol 950 to the second signal processing device 170*b* (S914).

In response thereto, in order to acknowledge reception of the capability information, the server virtual machine 520*b* in the second signal processing device 170*b* can set the reserved information 952 in the interface protocol 950 to [0x03] and can transmit the interface protocol 950 to the signal processing device 170 (S916).

The first virtual machine 520 in the processor 175 in the signal processing device 170 may check the capability information or the resource information of the server virtual machine 520*b* in the second signal processing device 170*b* based on the reserved information 952 in the received interface protocol 950.

FIG. 9C is a diagram illustrating various kinds of capability information and resource information of the first virtual machine 520 in the processor 175 in the signal processing device 170 and the server virtual machine 520*b* in the second signal processing device 170*b*.

FIG. 9C(a) illustrates that the capability information of the first virtual machine 520 in the processor 175 in the signal processing device 170 is object detection and 30% of resources are used, and the capability information of the server virtual machine 520*b* in the second signal processing device 170*b* is media digital rights management (DRM) and 40% of resources are used.

FIG. 9C(b) illustrates that the capability information of the first virtual machine 520 in the processor 175 in the signal processing device 170 is object detection and 30% of resources are used, and illustrates that the capability information of the server virtual machine 520*b* in the second signal processing device 170*b* is distributed object rendering and 35% of resources are used.

FIG. 9C(c) illustrates that the capability information of the first virtual machine 520 in the processor 175 in the signal processing device 170 is media digital rights management (DRM) and 40% of resources are used, and illustrates that the capability information of the server virtual machine 520*b* in the second signal processing device 170*b* is distributed object rendering and 35% of resources are used.

In some implementations, the first virtual machine 520 in the processor 175 in the signal processing device 170 determines one of the signal processing device 170 and the second signal processing device 170*b* to be a master signal processing device based on various kinds of capability information or resource information, as depicted in FIG. 9C. Consequently, the signal processing device 170 and the second signal processing device 170*b* can be efficiently operated.

Figure 10A:
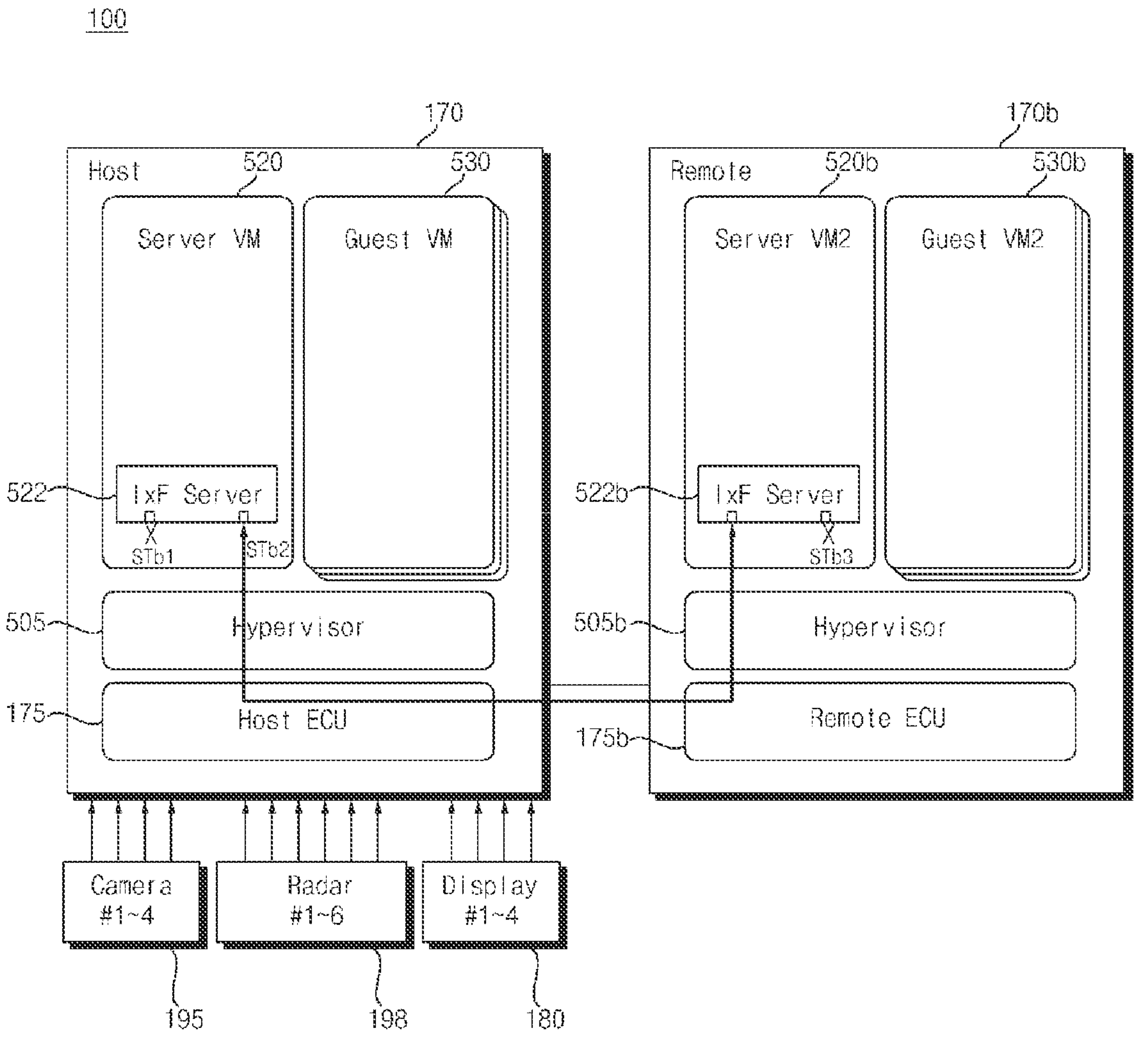

FIG. 10A is a diagram illustrating a case in which no deserializer network 1000 is present in the display apparatus 100 for vehicle.

Referring to FIG. 10A, the signal processing device 170 in the display apparatus 100 for vehicle can receive an image signal, a sensing signal, and an image signal from a camera 195, a radar 198, and a display 180, respectively, not via the deserializer network 1000.

In particular, the first virtual machine 520 in the processor 175 in the signal processing device 170 can receive image data, sensing data, and image data from the camera 195, the radar 198, and the display 180, respectively.

In some implementations, in response to the signal processing device 170 being a master signal processing device, the input and output server interface 522 in the first virtual machine 520 can transmit at least some of the image data, the sensing data, and the image data to the input and output server interface 522*b* in the server virtual machine 520*b* in the second signal processing device 170*b* for data processing or data sharing (STb2).

Consequently, the plurality of signal processing devices 170 and 170*b* can efficiently perform data processing.

Figure 10B:
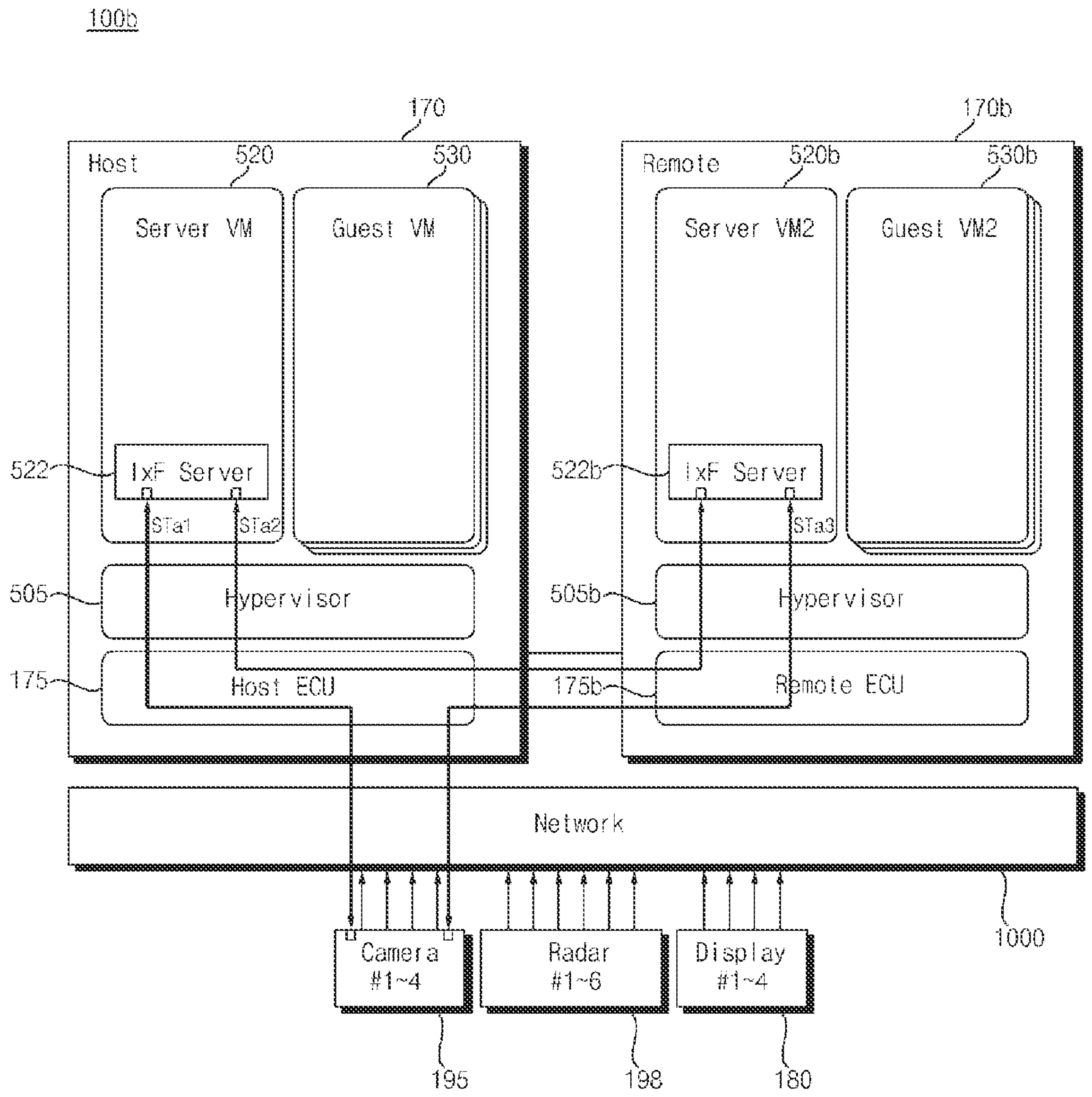

FIG. 10B is a diagram illustrating a case in which a deserializer network 1000 is present in a display apparatus 100*b* for vehicle.

The deserializer network can refer to a network configured to allow the plurality of signal processing devices 170 and 170*b* to perform data input and output with the camera 195, the radar 198, and the display 180 in public.

Referring to FIG. 10B, the signal processing device 170 in the display apparatus 100*b* for vehicle can receive an image signal, a sensing signal, and an image signal from the camera 195, the radar 198, and the display 180, respectively, or can transmit signals to the camera 195, the radar 198, and the display 180, respectively, via the deserializer network 1000 (STa1).

In particular, the first virtual machine 520 in the processor 175 in the signal processing device 170 can receive image data, sensing data, and image data from the camera 195, the radar 198, and the display 180, respectively, or can transmit signals to the camera 195, the radar 198, and the display 180, respectively, via the deserializer network 1000.

In some implementations, in response to the signal processing device 170 being a master signal processing device, the input and output server interface 522 in the first virtual machine 520 can transmit at least some of the image data, the sensing data, and the image data to the input and output server interface 522*b* in the server virtual machine 520*b* in the second signal processing device 170*b* for data processing or data sharing (STa2).

In some implementations, in response to the signal processing device 170 being a master signal processing device, the first virtual machine 520 in the processor 175 may check whether to access the deserializer network 1000.

Subsequently, the first virtual machine 520 in the processor 175 can transmit an access message for access to the deserializer network 1000 to the second signal processing device 170*b*, and, in response to no access allowance message for access to the deserializer network 1000 being received from the second signal processing device 170*b*, can be configured to operate the signal processing device 170 as a master signal processing device 170. Consequently, any one of the plurality of signal processing devices 170 and 170*b* can be set as a master signal processing device, whereby data processing can be efficiently performed.

In some implementations, the first virtual machine 520 in the processor 175 can transmit an access message for access to the deserializer network 1000 to the second signal processing device 170*b*, and, in response to an access allowance message for access to the deserializer network 1000 being received from the second signal processing device 170*b*, can be configured to operate any one of the second signal processing device 170*b* and the signal processing device 170 as a master signal processing device 170 based on the capability information or the resource information of the second signal processing device 170*b*. Consequently, any one of the plurality of signal processing devices 170 and 170*b* can be set as a master signal processing device, whereby data processing can be efficiently performed.

In some implementations, in response to the second signal processing device 170*b* being a master signal processing device, the input and output server interface 522*b* in the server virtual machine 520*b* can receive image data, sensing data, and image data from the camera 195, the radar 198, and the display 180, respectively, via the deserializer network 1000 (STa3).

In some implementations, in response to the second signal processing device 170*b* being a master signal processing device, the input and output server interface 522*b* in the server virtual machine 520*b* can transmit at least some of the image data, the sensing data, and the image data to the input and output server interface 522 in the server virtual machine 520 in the signal processing device 170 for data processing or data sharing (STb2). Consequently, any one of the plurality of signal processing devices 170 and 170*b* can be set as a master signal processing device, whereby data processing can be efficiently performed.

In some implementations, the first virtual machine 520 in the processor 175 can receive capability information or resource information of the plurality of virtual machines driven in the second signal processing device 170*b*, and can control any one of the plurality of virtual machines driven in the second signal processing device 170*b* based on the capability information or resource information of the plurality of virtual machines. Consequently, the plurality of signal processing devices 170 and 170*b* can efficiently perform data processing. This will be described with reference to FIG. 10C.

Figure 10C:
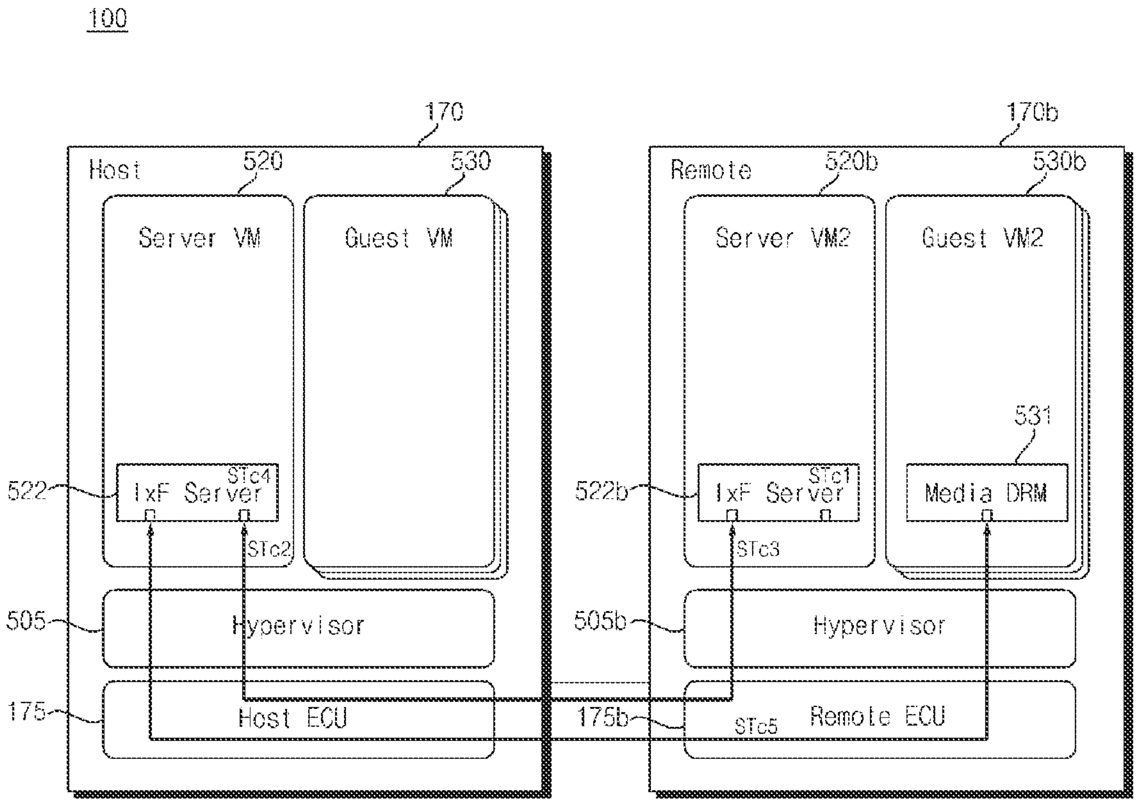

FIG. 10C is a diagram illustrating that, in response to no deserializer network 1000 being present in the display apparatus 100 for vehicle, the guest virtual machine 530*b* in the second signal processing device 170*b* is controlled.

Referring to FIG. 10C, each of the signal processing device 170 and the second signal processing device 170*b* in the display apparatus 100 for vehicle can collect capability information or resource information of the virtual machine (STc1).

In some implementations, the input and output server interface 522 in the first virtual machine 520 in the signal processing device 170 transmits a capability information request message to the input and output server interface 522*b* in the server virtual machine 520*b* in the second signal processing device 170*b* (STc2).

In response thereto, the input and output server interface 522*b* in the server virtual machine 520*b* in the second signal processing device 170*b* can transmit a capability information message to the input and output server interface 522 in the first virtual machine 520 in the signal processing device 170 (STc3).

In some implementations, the capability information message can include capability information of the server virtual machine 520*b* and capability information of the guest virtual machine 530*b* in the second signal processing device 170*b*.

In some implementations, the first virtual machine 520 in the signal processing device 170 determines whether at least one of the plurality of virtual machines in the second signal processing device 170*b* is directly controllable based on the received capability information message (STc4).

In response to at least one of the plurality of virtual machines in the second signal processing device 170*b* being directly controllable, the first virtual machine 520 in the signal processing device 170 can directly control the virtual machine.

FIG. 10C illustrates that the first virtual machine 520 in the signal processing device 170 directly controls the guest virtual machine 530*b*, which is one of the plurality of virtual machines in the second signal processing device 170*b*.

For example, the first virtual machine 520 in the signal processing device 170 can directly control media DRM executed by the guest virtual machine 530*b* in the second signal processing device 170*b*. Consequently, data processing can be efficiently performed.

Figure 10D:
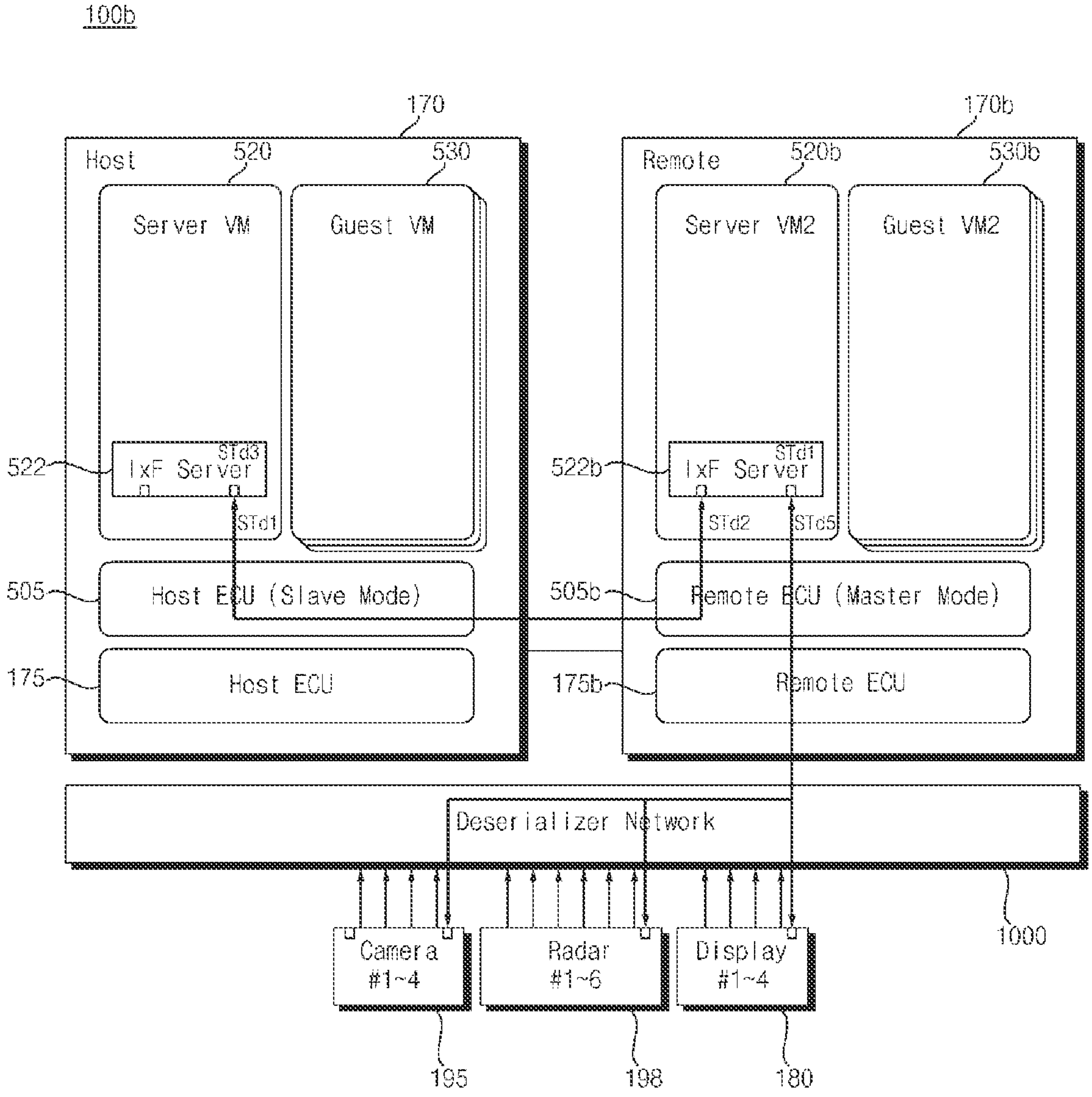

FIG. 10D is a diagram illustrating that, in response to the deserializer network 1000 being present in the display apparatus 100 for vehicle, the guest virtual machine 530*b* in the second signal processing device 170*b* is controlled.

Referring to FIG. 10D, the signal processing device 170 in the display apparatus 100 for vehicle can transmit a master authority transfer message to the second signal processing device 170*b* (STd1).

The master authority transfer message can include a command including a mode for each signal processing device, information regarding an application that is executed, or a parameter.

Specifically, the input and output server interface 522 in the first virtual machine 520 in the signal processing device 170 can transmit the master authority transfer message to the input and output server interface 522*b* in the server virtual machine 520*b* in the second signal processing device 170*b*.

In response thereto, the input and output server interface 522*b* in the server virtual machine 520*b* in the second signal processing device 170*b* can transmit an acknowledgement (ACK) message to the input and output server interface 522 in the first virtual machine 520 in the signal processing device 170 (STd2).

As a result, the signal processing device 170 can be operated in a slave mode (STd3). In addition, the second signal processing device 170*b* can be operated in a master mode (STd4).

The second signal processing device 170*b* can receive various data through the deserializer network 1000 depending on the master mode.

For example, the input and output server interface 522*b* in the server virtual machine 520*b* can receive image data, sensing data, and image data from the camera 195, the radar 198, and the display 180, respectively, via the deserializer network 1000.

Figure 11A:
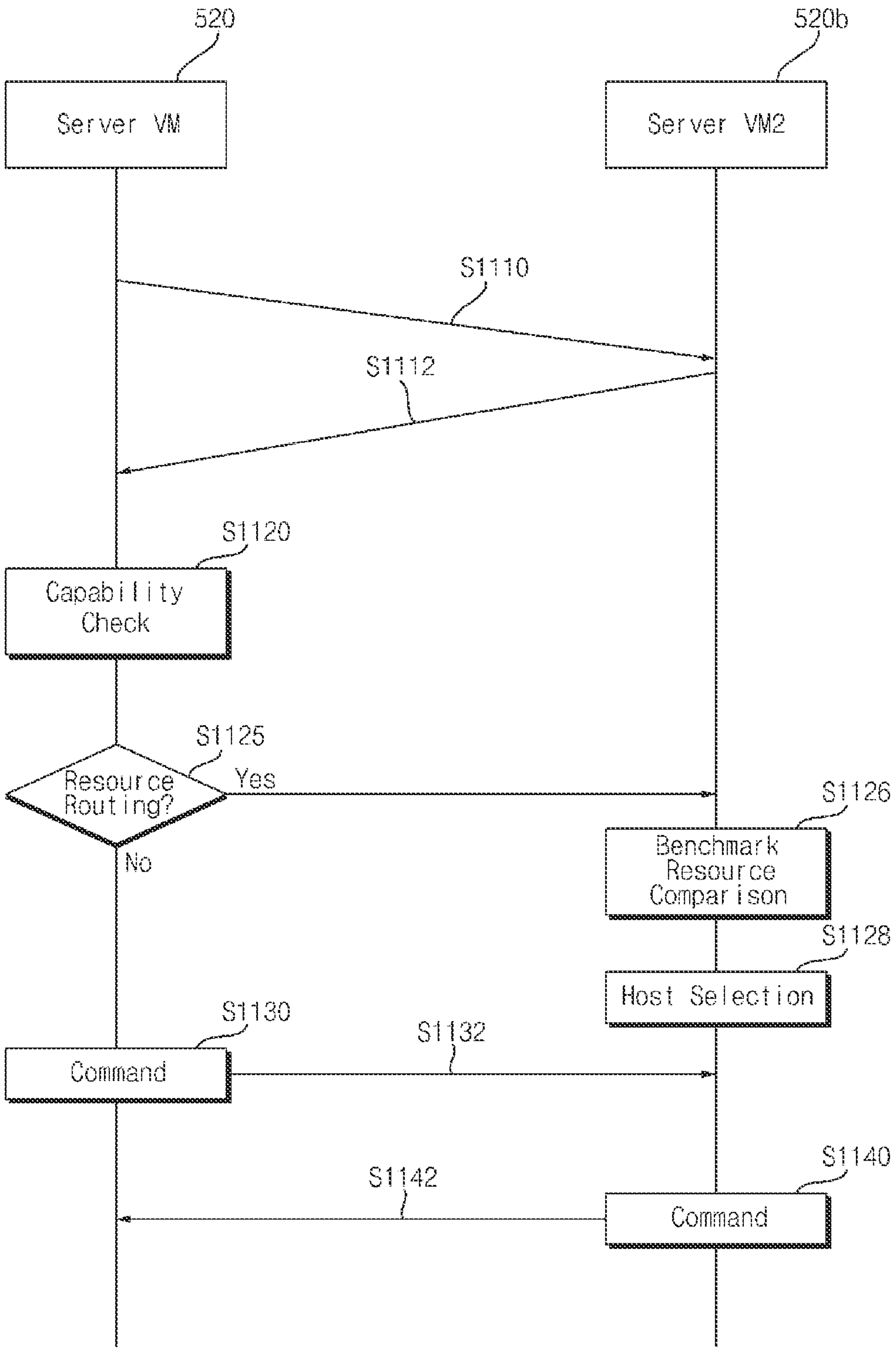

FIG. 11A is a diagram illustrating an example of exchange of capability information or resource information between the first virtual machine 520 in the signal processing device 170 and the server virtual machine 520*b* in the second signal processing device 170*b*.

Referring to FIG. 11A, the first virtual machine 520 in the processor 175 in the signal processing device 170 can set the reserved information 952 in the interface protocol 950 to [0x00] and can transmit the interface protocol 950 to the second signal processing device 170*b* (S1110).

In response thereto, the server virtual machine 520*b* in the second signal processing device 170*b* can set the reserved information 952 in the interface protocol 950 to [0x01] and can transmit the interface protocol 950 to the signal processing device 170 (S1112).

In response to the reserved information 952 in the received interface protocol 950 being [0x01], the first virtual machine 520 in the processor 175 in the signal processing device 170 can determine that a virtual machine is present in the second signal processing device 170*b*.

In some implementations, the first virtual machine 520 in the processor 175 in the signal processing device 170 checks capability information of the second signal processing device 170*b* (S1120).

Subsequently, the first virtual machine 520 in the processor 175 in the signal processing device 170 may check whether resource routing of the second signal processing device 170*b* is possible (S1125).

For example, the reserved information 952 in the interface protocol 950 can be set to [0x02] and then the interface protocol 950 can be transmitted to the second signal processing device 170*b*.

In response thereto, in order to acknowledge reception of the capability information, the server virtual machine 520*b* in the second signal processing device 170*b* can set the reserved information 952 in the interface protocol 950 to [0x03] and can transmit the interface protocol 950 to the signal processing device 170.

The first virtual machine 520 in the processor 175 in the signal processing device 170 may check the capability information or the resource information of the server virtual machine 520*b* in the second signal processing device 170*b* based on the reserved information 952 in the received interface protocol 950.

For example, in response to the capability information of the server virtual machine 520*b* in the second signal processing device 170*b* being higher in level than the capability information of the first virtual machine 520 in the processor 175 in the signal processing device 170, the server virtual machine 520*b* in the second signal processing device 170*b* can be operated in a master mode.

In some implementations, the server virtual machine 520*b* in the second processor 175*b* in the second signal processing device 170*b* can compare the received capability information or resource information of the first virtual machine 520 in the signal processing device with the capability information or resource information of the server virtual machine (S1126). Subsequently, a master device can be selected based thereon (S1128).

For example, in response to the capability information or available resource information of the server virtual machine 520*b* in the second processor 175*b* in the second signal processing device 170*b* being higher in level than the capability information or available resource information of the first virtual machine 520 in the processor 175 in the signal processing device 170, the server virtual machine 520*b* in the second signal processing device 170*b* can be operated in a master mode.

In some implementations, in response to being set to a master device, the first virtual machine 520 in the processor 175 in the signal processing device 170 can transmit a command to the server virtual machine 520*b* in the second signal processing device 170*b* (S1130). In response thereto, the server virtual machine 520*b* in the second signal processing device 170*b* can receive the command (S1132).

The server virtual machine 520*b* in the second signal processing device 170*b* can share data, and can perform signal processing on the shared data. Consequently, data processing can be efficiently performed.

In some implementations, in response to being set to a master device, the server virtual machine 520*b* in the second signal processing device 170*b* can transmit a command to the first virtual machine 520 in the signal processing device 170 (S1140). In response thereto, the first virtual machine 520 in the signal processing device 170 can receive the command (S1142).

The first virtual machine 520 in the signal processing device 170 can share data, and can perform signal processing for the shared data. Consequently, data processing can be efficiently performed.

In some implementations, the first virtual machine 520 in the processor 175 can transmit an authority transfer message to the server virtual machine 520*b* in the second processor 175*b* during operation of the signal processing device 170 as a master signal processing device 170, and, upon receiving an acknowledgement message from the server virtual machine 520*b* in the second processor 175*b*, can be configured to change the second signal processing device 170*b* to a master signal processing device 170. Consequently, any one of the plurality of signal processing devices 170 and 170*b* can be set as a master signal processing device, whereby data processing can be efficiently performed.

Figure 11B:
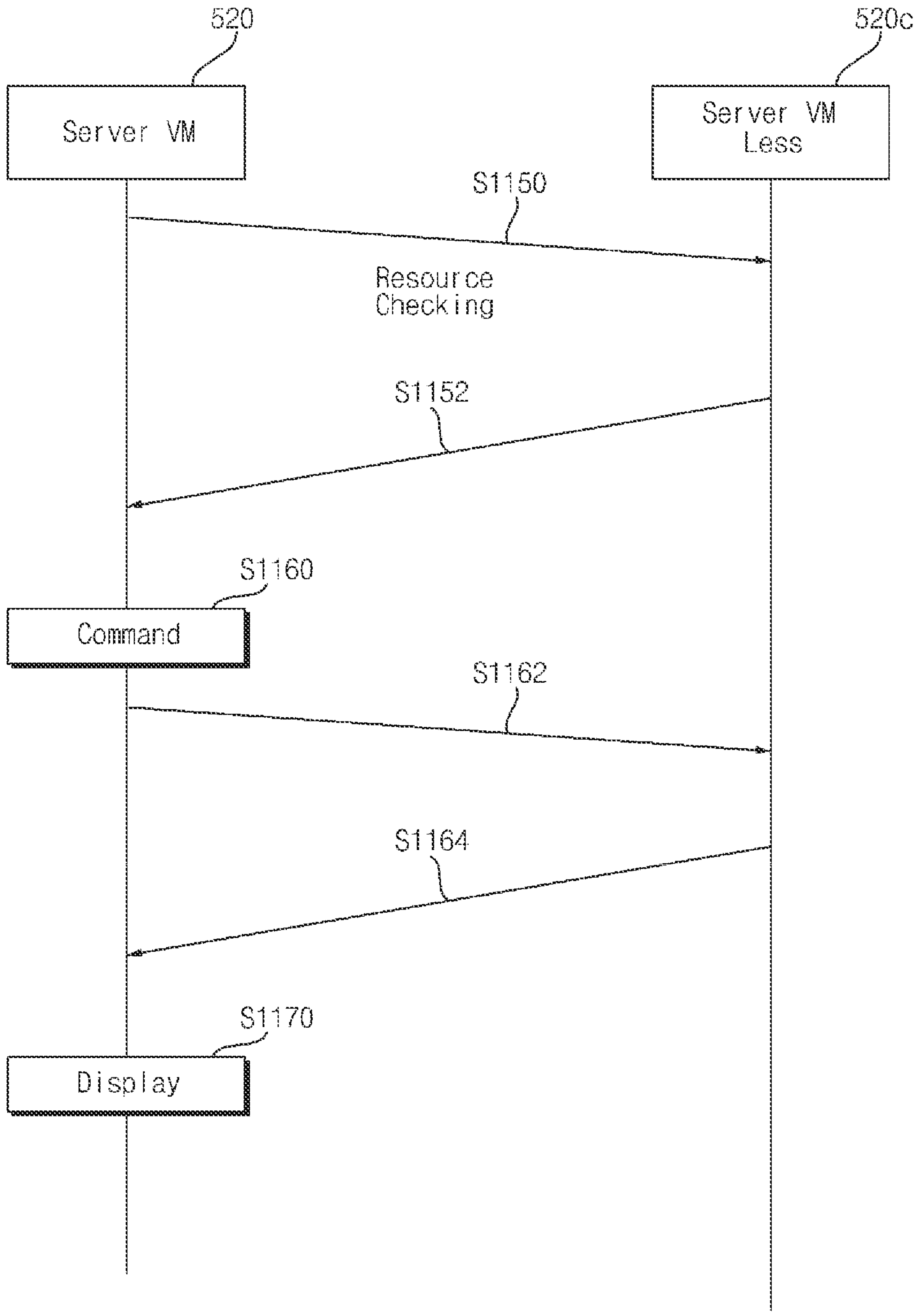

FIG. 11B is a diagram illustrating an example of exchange of resource information between the first virtual machine 520 in the signal processing device 170 and the second signal processing device 170*b* having no server virtual machine 520*c* and resource sharing based thereon.

Referring to FIG. 11B, the first virtual machine 520 in the signal processing device 170 may check resources of the second signal processing device 170*b* (S1150).

Accordingly, the second signal processing device 170*b* can transmit resource information to the first virtual machine 520 in the signal processing device 170 (S1152).

In some implementations, the first virtual machine 520 in the signal processing device 170 is operated as a master device, since there is no server virtual machine 520*c* in the second signal processing device 170*b* (S1160).

Subsequently, the first virtual machine 520 in the signal processing device 170 can request distributed processing of data based on the received resource information (S1162).

In response thereto, the second signal processing device 170*b* can perform distributed processing of data, and can transmit result information thereabout to the first virtual machine 520 in the signal processing device 170 (S1164).

The first virtual machine 520 in the signal processing device 170 can be configured to display the results of distributed processing of data on the displays 180*a* and 180*b* (S1170). Consequently, the plurality of signal processing devices 170 and 170*b* can efficiently perform data processing.

For example, in response to distributed processing of data being distributed processing of data for object detection of camera image data, result data of object detection can be displayed on the displays 180*a* and 180*b* based on the result of object detection partially processed by the second signal processing device 170*b*.

By way of further example, in response to distributed processing of data being media DRM processing, data of media DRM processing can be displayed on the displays 180*a* and 180*b* based on the result of media DRM processing partially processed by the second signal processing device 170*b*.

Figure 12:
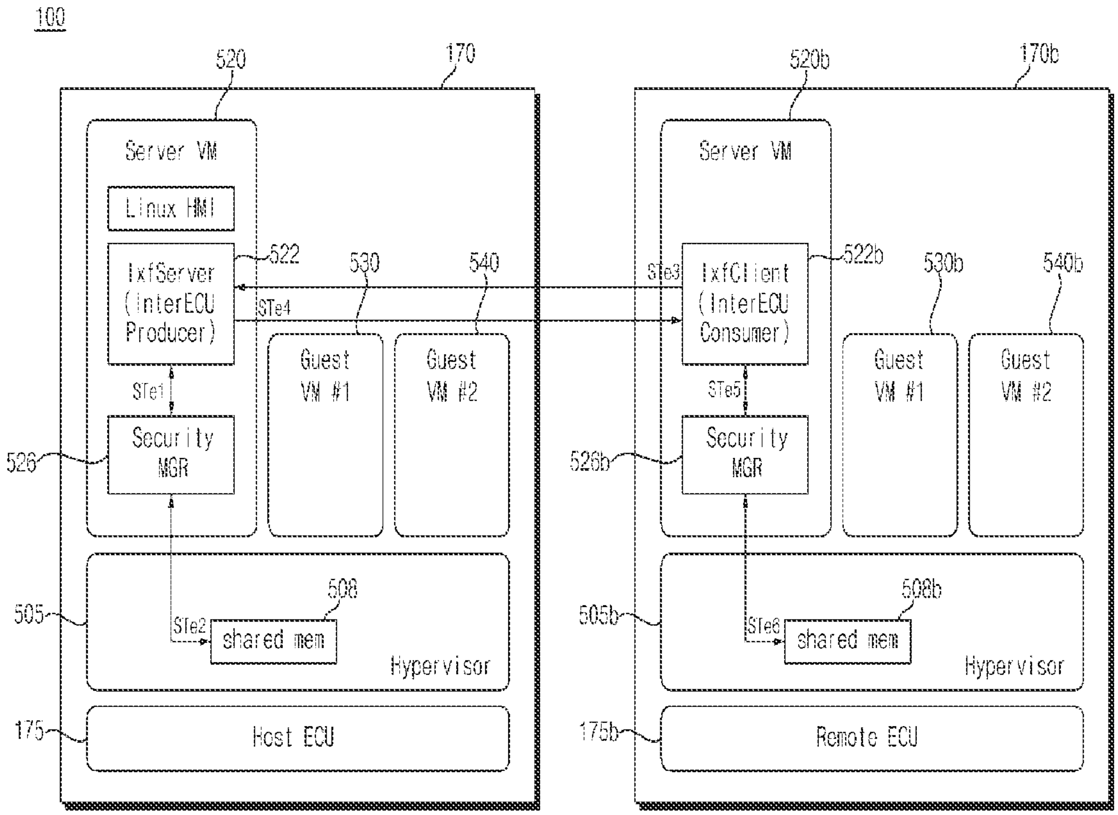

FIG. 12 is a diagram referred to for describing data sharing in the display apparatus 100 for vehicle.

Referring to FIG. 12, to transmit shared data, the input and output server interface 522 in the first virtual machine 520 in the signal processing device 170 can transmit a request for allocation of the shared memory 508 to the security manager 526 (STe1).

Subsequently, the security manager 526 can allocate the shared memory 508 using the hypervisor 505 (STe2), and can write shared data in the shared memory 508.

In some implementations, the input and output server interface 522*b* in the server virtual machine 520*b* in the second signal processing device 170*b* can transmit a request for connection to the input and output server interface 522 after allocation of the shared memory 508 (STe3).

In some implementations, the input and output server interface 522 transmits information regarding the shared memory 508 including key data to the input and output server interface 522*b* in the server virtual machine 520*b* in the second signal processing device 170*b* after allocation of the shared memory 508 (STe4). IN some implementations, the key data can be private key data.

Subsequently, the input and output server interface 522*b* in the server virtual machine 520*b* in the second signal processing device 170*b* can transmit a request for allocation of the second shared memory 508*b* to the security manager 526 based on the received key data (STe5).

Subsequently, the security manager 526 can allocate the second shared memory 508*b* using the hypervisor 505*b* (STe6), and can write shared data in the second shared memory 508*b* (STe7).

In addition, the input and output server interface 522*b* in the server virtual machine 520*b* in the second signal processing device 170*b* can request data from the input and output server interface 522 for writing of data in the second shared memory 508*b*.

In some implementations, the plurality of guest virtual machines 530*b* and 540*b* in the second signal processing device 170*b* can perform signal processing using the data in the second shared memory 508*b*.

Consequently, the plurality of signal processing devices 170 and 170*b* can divide and process data. In addition, the plurality of signal processing devices 170 and 170*b* can efficiently manage resources.

Figure 13:
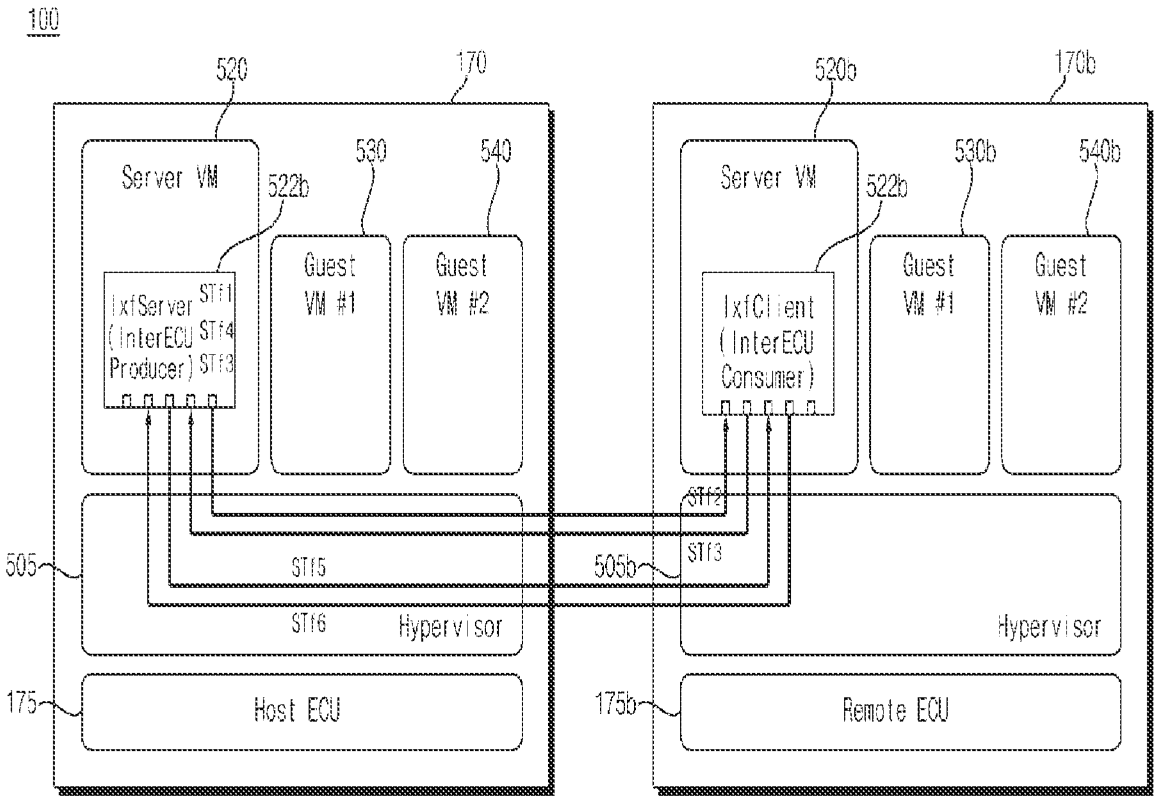

FIG. 13 is a diagram describing setting of a master signal processing device between the signal processing device and the second signal processing device in the display apparatus 100 for vehicle.

Referring to FIG. 13, after a booting sequence is completed, the first virtual machine 520 in the signal processing device 170 and the server virtual machine 520*b* in the second signal processing device 170*b* can execute a benchmark program and store capability scores of the processors 175 and 175*b* (STf1).

Specifically, capability scores of the first virtual machine 520 and the server virtual machine 520*b* can be checked.

Subsequently, the first virtual machine 520 in the signal processing device 170 can attempt to access the server virtual machine 520*b* in the second signal processing device 170*b* (STf2).

In response to access being accomplished, the server virtual machine 520*b* in the second signal processing device 170*b* can transmit state information, such as a benchmark score and current usage of CPU/RAM/GPU resources, to the first virtual machine 520 in the signal processing device 170 as a result message (STf3).

Subsequently, the first virtual machine 520 in the signal processing device 170 can check the result message of the server virtual machine 520*b* in the second signal processing device 170*b*, and determine any one of the signal processing device 170 and the second signal processing device 170*b* to be a master device (STf4).

In some implementations, any one of the signal processing device and the second signal processing device can be determined to be a master device based on an available capability score that is inversely proportional to usage.

For example, in response to the difference in available capability score between the first virtual machine 520 in the signal processing device 170 and the server virtual machine 520*b* in the second signal processing device 170*b* being a first reference value (e.g. 10%) or less, the first virtual machine 520 in the signal processing device 170 can have master authority.

As another example, in response to the difference in available capability score between the first virtual machine 520 in the signal processing device 170 and the server virtual machine 520*b* in the second signal processing device 170*b* being between the first reference value and a second reference value (e.g. 10% to 70%), a signal processing device having a high available capability score can have master authority, and a signal processing device having a low available capability score can be operated as a slave.

As another example, in response to the available capability score of the server virtual machine 520*b* in the second signal processing device 170*b* being higher than the available capability score of the first virtual machine 520 in the signal processing device 170 by the second reference value (e.g. 70%) or more, the server virtual machine 520*b* in the second signal processing device 170*b* can have master authority. Consequently, all computations can be performed by the server virtual machine 520*b* in the second signal processing device 170*b*.

As another example, in response to the available capability score of the first virtual machine 520 in the signal processing device 170 being higher than the available capability score of the server virtual machine 520*b* in the second signal processing device 170*b* by the second reference value (e.g. 70%) or more, the first virtual machine 520 in the signal processing device 170 can finish connection with the server virtual machine 520*b* in the second signal processing device 170*b*, and may not perform distributed processing.

In some implementations, the first virtual machine 520 in the signal processing device 170 transmits the result of calculation of operation scheme between the first virtual machine 520 in the signal processing device 170 and the server virtual machine 520*b* in the second signal processing device 170*b* to the server virtual machine 520*b* in the second signal processing device 170*b* (STf5).

Subsequently, the server virtual machine 520*b* in the second signal processing device 170*b* can transmit an acknowledgement (ACK) message for the result message to the first virtual machine 520 in the signal processing device 170 (STf6).

Subsequently, the first virtual machine 520 in the signal processing device 170 and the server virtual machine 520*b* in the second signal processing device 170*b* can change operation modes based on the result of calculation of operation scheme (STf7).

Figure 14:
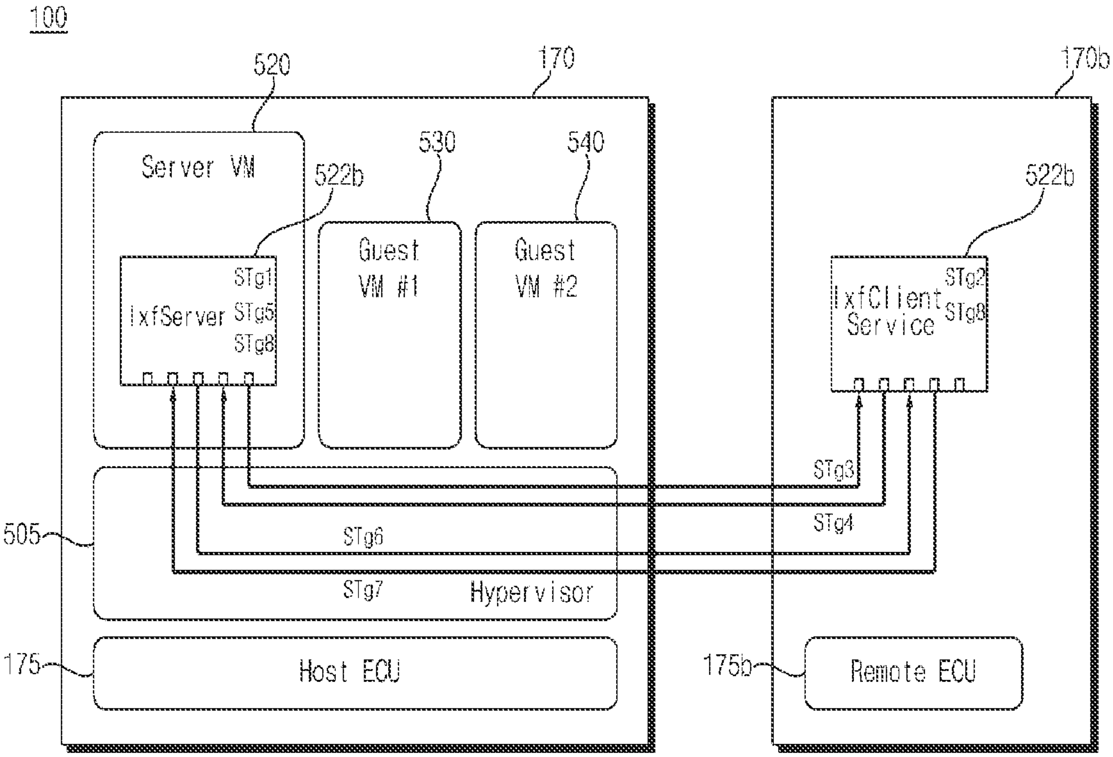

FIG. 14 is a diagram describing setting of a master signal processing device between the signal processing device and the second signal processing device in the display apparatus 100 for vehicle.

FIG. 14 is similar to FIG. 13 except that the server virtual machine 520*b* is not driven in the second signal processing device 170*b*.

For example, after a booting sequence is completed, the first virtual machine 520 in the signal processing device 170 executes a benchmark program and stores a capability score of the processor 175 (STg1).

Subsequently, the input and output server interface 522*b* in the second signal processing device 170*b* can execute a benchmark program and store a capability score of the second processor 175*b* (STg2).

Subsequently, the first virtual machine 520 in the signal processing device 170 can attempt to access the second signal processing device 170*b* (STg3).

In response to access being accomplished, the second signal processing device 170*b* can transmit state information, such as a benchmark score and current usage of CPU/RAM/GPU resources, to the first virtual machine 520 in the signal processing device 170 as a result message (STg4).

Subsequently, the first virtual machine 520 in the signal processing device 170 can check the result message of the second signal processing device 170*b*, and determine any one of the signal processing device 170 and the second signal processing device 170*b* to be a master device (STg5).

In some implementations, any one of the signal processing device and the second signal processing device can be determined to be a master device based on an available capability score that is inversely proportional to usage.

For example, in response to the difference in available capability score between the first virtual machine 520 in the signal processing device 170 and the second signal processing device 170*b* being a first reference value (e.g. 10%) or less, the first virtual machine 520 in the signal processing device 170 can have master authority.

As another example, in response to the difference in available capability score between the first virtual machine 520 in the signal processing device 170 and the second signal processing device 170*b* being between the first reference value and a second reference value (e.g. 10% to 70%), a signal processing device having a high available capability score can have master authority, and a signal processing device having a low available capability score can be operated as a slave.

As another example, in response to the available capability score of the second signal processing device 170*b* being higher than the available capability score of the first virtual machine 520 in the signal processing device 170 by the second reference value (e.g. 70%) or more, the second signal processing device 170*b* can have master authority. Consequently, all computations can be performed by the second signal processing device 170*b*.

As another example, in response to the available capability score of the first virtual machine 520 in the signal processing device 170 being higher than the available capability score of in the second signal processing device 170*b* by the second reference value (e.g. 70%) or more, the first virtual machine 520 in the signal processing device 170 can finish connection with the second signal processing device 170*b*, and may not perform distributed processing.

In some implementations, the first virtual machine 520 in the signal processing device 170 transmits the result of calculation of operation scheme between the first virtual machine 520 in the signal processing device 170 and the second signal processing device 170*b* to the second signal processing device 170*b* (STg6).

Subsequently, the input and output server interface 522*b* in the second signal processing device 170*b* can transmit an acknowledgement (ACK) message for the result message to the first virtual machine 520 in the signal processing device 170 (STg7).

Subsequently, the first virtual machine 520 in the signal processing device 170 and the second signal processing device 170*b* can change operation modes based on the result of calculation of operation scheme (STg8).

In some implementations, the first virtual machine 520 in the processor 175 can create a command queue for distributed processing of data. This will be described with reference to FIG. 15 and subsequent figures.

Figure 15:
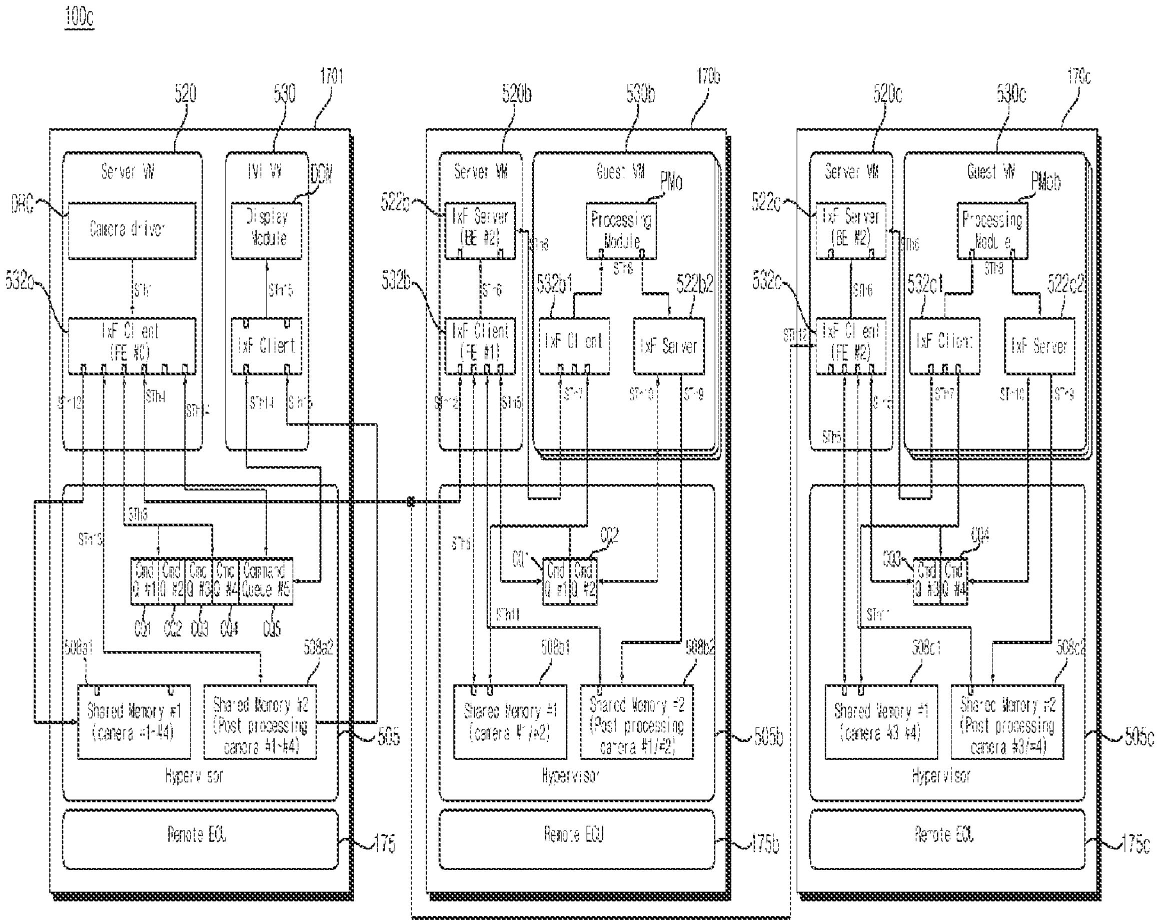

FIG. 15 is a diagram describing that a plurality of signal processing devices in the display apparatus 100 for vehicle shares a memory.

Referring to FIG. 15, the display apparatus 100 for vehicle can include the signal processing device 170, the second signal processing device 170*b*, and a third signal processing device 170*c*.

The signal processing device 170 can share data with the second signal processing device 170*b* and the third signal processing device 170*c*.

For example, the first virtual machine 520 in the processor 175 in the signal processing device 170 can include a camera driver DRc configured to process an image from a camera.

In addition, the first virtual machine 520 in the processor 175 in the signal processing device 170 can further include a position information driver configured to process position information and a touch driver configured to process touch input.

The first virtual machine 520 in the processor 175 in the signal processing device 170 can set a shared memory based on the hypervisor 505 for each driver.

In some implementations, the first virtual machine 520 in the processor 175 in the signal processing device 170 can set shared memories 508*a*1 and 508*a*2 using the hypervisor 505 for the camera driver DRc.

The shared memory 508*a*1 can be a shared memory for image data from a plurality of camera devices, and the shared memory 508*a*2 can be a shared memory for post-processing of the image data from the plurality of camera devices.

The input and output server interface 522 in the first virtual machine 520 can receive image data from the camera driver DRc (STh1).

Subsequently, the input and output server interface 522 in the first virtual machine 520 can be configured to write or update the received image data in the shared memory 508*a*1 (STh2).

Subsequently, the input and output server interface 522 in the first virtual machine 520 can create command queues corresponding to the number of guest virtual machines available in the second signal processing device 170*b* and the third signal processing device 170*c* (STh3).

For example, the first virtual machine 520 in the processor 175 can create command queues corresponding to the number of virtual machines for distributed processing of data in the second processor 175*b* or a third processor 175*c*.

For example, in response to the number of guest virtual machines available in the second signal processing device 170*b* being 2 and the number of guest virtual machines available in the third signal processing device 170*c* being 2, as depicted in FIG. 15, the input and output server interface 522 in the first virtual machine 520 can be configured to create four command queues.

In some implementations, each command queue can include at least one of command type information, buffer ID information, or buffer address information.

Subsequently, the first virtual machine 520 in the signal processing device 170 can transmit camera-related image data and command queue data to the server virtual machine 520*b* in the second signal processing device 170*b* (STh4).

For example, the input and output server interface 522 in the first virtual machine 520 can transmit camera-related image data and command queue data to the input and output client interface 532*b* in the server virtual machine 520*b*.

In some implementations, as depicted in FIG. 15, the transmitted camera-related image data can be image data related to first and second cameras, among image data related to first to fourth cameras.

In some implementations, the input and output client interface 532*b* in the server virtual machine 520*b* can store the received camera-related image data and command queue data in a shared 508*b*1 (STh5).

Subsequently, the server virtual machine 520*b* in the second processor 175*b* in the second signal processing device 170*b* can inform the guest virtual machine 530*b* of reception of the camera-related image data (STh6).

Subsequently, an input and output client interface 532*b*1 in the guest virtual machine 530*b* in the second signal processing device 170*b* can read the data written in the shared 508*b*1 with reference to the received command queue (STh7).

Subsequently, a processing module PMb in the guest virtual machine 530*b* can compute the read image data according to a command in the command queue (STh8).

For example, in response to the command in the command queue being object detection in the camera-related image data, the processing module PMb can perform object detection for the read image data.

By way of further example, in response to the command in the command queue being DRM execution of the image data, the processing module PMb can perform DRM decryption of the read image data.

Subsequently, the guest virtual machine 530*b* in the second signal processing device 170*b* can write result data processed by the processing module PMb in a second shared memory 508*b*2 allocated for the input and output server interface 522 (STh9).

Subsequently, the guest virtual machine 530*b* in the second signal processing device 170*b* can inform the server virtual machine 520*b* of information related to the completion of writing the computation result in the second shared memory 508*b*2 through the command queue (STh10).

Subsequently, the server virtual machine 520*b* in the second processor 175*b* in the second signal processing device 170*b* can read processing result data written in the second shared memory 508*b*2 (STh11).

Subsequently, the server virtual machine 520*b* in the second processor 175*b* in the second signal processing device 170*b* can transmit the processing result data and the command queue data to the first virtual machine 520 in the processor 175 in the signal processing device 170 (STh12).

Subsequently, the first virtual machine 520 in the processor 175 in the signal processing device 170 can be configured to store the received processing result data in the shared memory 508*a*2 (STh13).

Subsequently, the first virtual machine 520 in the processor 175 in the signal processing device 170 can transmit a display command to the input and output client interface 532 in the second virtual machine 530 through a fifth command queue #5 (STh14).

Subsequently, the second virtual machine 530 can be configured to display a related image while reading the processing result data written in the second shared memory 508*b* (STh15).

In some implementations, the steps performed by the second signal processing device 170*b* from step STh4 to step STh12 can be equally performed in the third signal processing device 170*c*.

For example, the first virtual machine 520 in the processor 175 in the signal processing device 170 can transmit image data related to third and fourth cameras, among image data related to first to fourth cameras, and command queue data to a server virtual machine 520*c* in the third signal processing device 170*c*, the server virtual machine 520*c* in the third signal processing device 170*c* can store the received image data in a shared memory 508*c*1, a guest virtual machine 530*c* can receive and process the stored image data and can store the processed result data in a shared memory 508*c*2, and the server virtual machine 520*c* in the third signal processing device 170*c* can transmit the result data stored in the shared memory 508*c*2 to the first virtual machine 520 in the processor 175 in the signal processing device 170.

Consequently, the signal processing device 170, the second signal processing device 170*b*, and the third signal processing device 170*c* can divide and efficiently process data.

Figure 16:
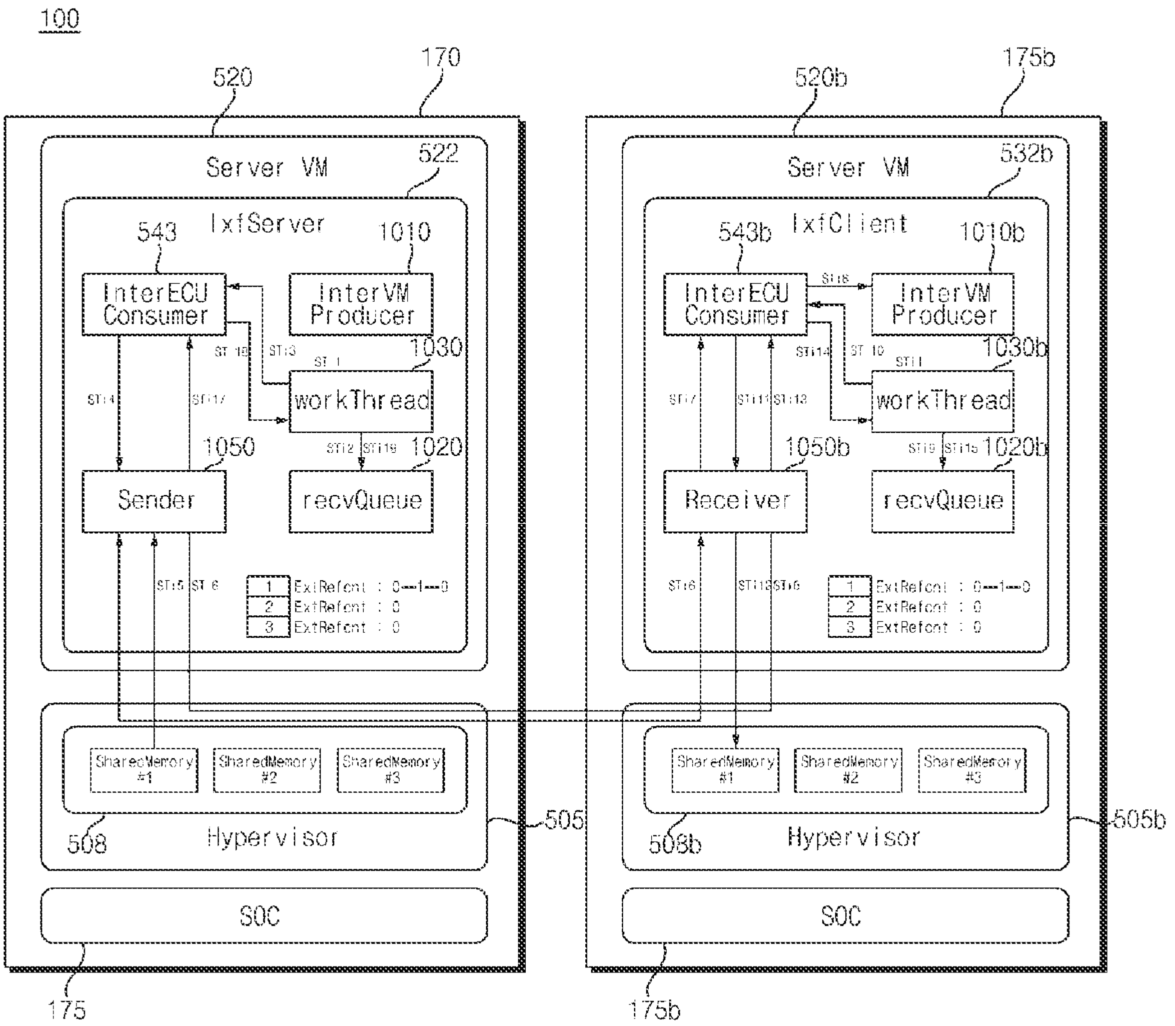

FIG. 16 is a diagram describing memory synchronization between the signal processing device 170 and the second signal processing device 170*b*.

Referring to FIG. 16, the input and output server interface 522 in the first virtual machine 520 in the signal processing device 170 can include a consumer 543, a sender 1050, a producer 1010 configured to create a synchronization object for graphical synchronization, a recvQueue 1020 configured to manage, particularly receive, a queue, a WorkThread 1030 configured to manage a queue and to control operation of the queue, and a SendQueue 1040 configured to manage, particularly transmit, a queue.

In some implementations, a plurality of buffers can be set in the shared memory 508 in the signal processing device 170.

The input and output client interface 532*b* in the server virtual machine 520*b* in the second signal processing device 170*b* can include a consumer 543*b*, a receiver 1050*b*, a producer 1010*b* configured to create a synchronization object for graphical synchronization, a recvQueue 1020*b* configured to manage, particularly receive, a queue, a WorkThread 1030*b* configured to manage a queue and to control operation of the queue, and a SendQueue 1040*b* configured to manage, particularly transmit, the queue.

In some implementations, a plurality of buffers can be set in the shared memory 508*b* in the second signal processing device 170*b*.

In some implementations, the WorkThread 1030 in the first virtual machine 520 checks whether data in the shared memory 508 have been changed (STi1).

Subsequently, the recvQueue 1020 can increase a reference count (Extrefcnt) of the shared memory 508 by 1 (STi2).

In some implementations, while the reference count (Extrefcnt) is 1, writing in the shared memory 508 may be impossible.

Subsequently, the WorkThread 1030 in the first virtual machine 520 can transmit information regarding a buffer index to the consumer 543 (STi3).

Subsequently, the consumer 543 can request reading of the shared memory 508 from the sender 1050 (STi4).

Subsequently, the sender 1050 can read data from the shared memory 508 (STi5). In particular, the sender 1050 can read changed data from the shared memory 508 (STi5).

Subsequently, the sender 1050 can transmit the read data and the buffer index to the server virtual machine 520*b* in the second signal processing device 170*b* (STi6).

Subsequently, the input and output client interface 532*b* in the server virtual machine 520*b* in the second signal processing device 170*b* can receive the data from the signal processing device 170, and can notify the consumer 543 of the received information (STi7).

Subsequently, the consumer 543*b* can request access to the buffer index from the producer 1010*b* (STi8).

Subsequently, the recvQueue 1020*b* or the WorkThread 1030*b* can increase a reference count (Extrefcnt) of the shared memory 508*b* by 1 (STi9).

In some implementations, while the reference count (Extrefcnt) is 1, writing in the shared memory 508*b* may be impossible.

Subsequently, the WorkThread 1030*b* in the server virtual machine 520*b* can transmit information regarding a buffer index to the consumer 543*b* (STi10).

Subsequently, the consumer 543*b* can request writing to the shared memory 508*b* from the receiver 1050*b* (STi11).

Subsequently, the receiver 1050*b* can write received data in the shared memory 508*b* (STi12).

Subsequently, the receiver 1050*b* can transmit information indicating the completion of use of the shared memory 508*b* to the consumer 543*b* (STi13).

Subsequently, the consumer 543*b* can return the received buffer index to the WorkThread 1030*b* (STi14).

Subsequently, the recvQueue 1020*b* can decrease the reference count (Extrefcnt) by 1 (STi15).

Subsequently, the receiver 1050*b* can transmit information indicating the completion of use of the shared memory

508*b* to the sender 1050 in the first virtual machine 520 in the signal processing device 170 (STi16).

Subsequently, the sender 1050 in the first virtual machine 520 in the signal processing device 170 can transmit information indicating the completion of use of the shared memory 508*b* to the consumer 543 (STi17).

Subsequently, the consumer 543 in the first virtual machine 520 in the signal processing device 170 can return the received buffer index to the WorkThread 1030*b* (STi18).

Subsequently, the recvQueue 1020 can decrease the reference count (Extrefcnt) by 1 (STi19).

Subsequently, in response to the reference count (Extrefcnt) becoming 0, the shared memory 508 can be used by the producer 1010, etc. again.

Consequently, data in the shared memory 508 in the signal processing device 170 and data in the shared memory 508*b* in the second signal processing device 170*b* can be synchronized and copied. Eventually, synchronization can be performed at the time of data sharing between different signal processing devices.

Based on this data synchronization technology, an image displayed on the first display 180*a* controlled by the second virtual machine 530 in the signal processing device 170 and an image displayed on the third display 180*c* controlled by the guest virtual machine 530*b* in the second signal processing device 170*b* can be synchronized, whereby the same images can be displayed.

Figure 17:
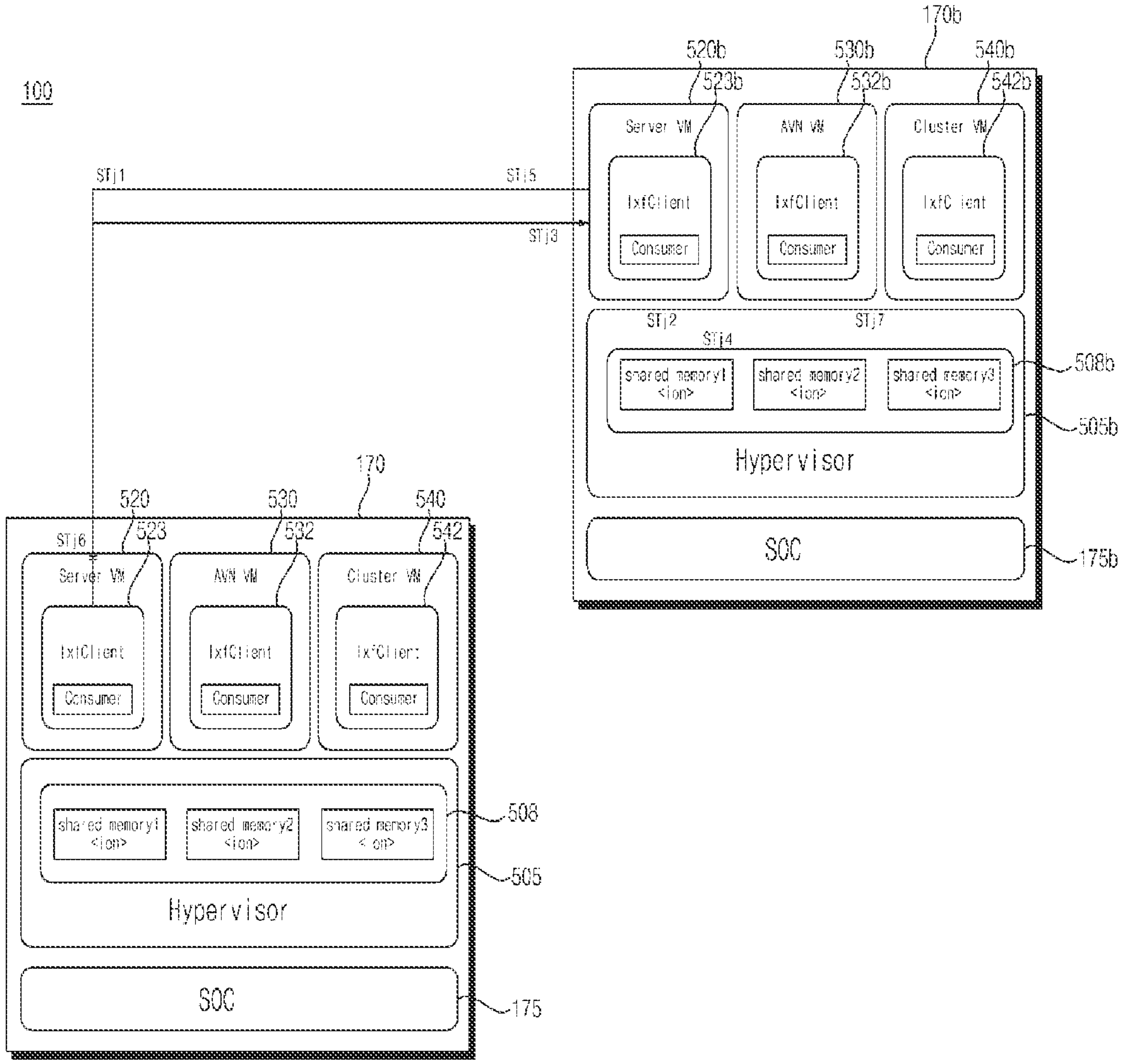

FIG. 17 is a diagram describing an exemplary rendering process between the signal processing device and the second signal processing device.

Referring to FIG. 17, at the time of initializing the first virtual machine 520 in the processor 175 in the signal processing device 170, in response to the server virtual machine 520*b* in the second processor 175*b* in the second signal processing device 170*b* accessing the first virtual machine 520, the first virtual machine 520 can transmit information regarding the number of shared memories or the number of buffers of a shared memory to the server virtual machine 520*b* (STj1).

Subsequently, the server virtual machine 520*b* in the second signal processing device 170*b* can create a second shared memory 508*b* (STj2).

Subsequently, in response to the shared memory 508 being updated by the producer 1010 in the first virtual machine 520, the first virtual machine 520 can transmit shared memory ID or buffer ID and image stream data to the server virtual machine 520*b* (STj3).

Subsequently, the server virtual machine 520*b* in the second signal processing device 170*b* can write the received image stream data in the second shared memory 508*b* based on the received shared memory ID or buffer ID (STj4).

Subsequently, in response to the reference count (Extrefcnt) for the second shared memory 508*b* becoming 0, the server virtual machine 520*b* in the second signal processing device 170*b* can transmit information regarding the reference count (Extrefcnt) to the first virtual machine 520 in the processor 175 in the signal processing device 170 (STj4).

Consequently, the first virtual machine 520 in the processor 175 in the signal processing device 170 can update the reference count (Extrefcnt) for the shared memory 508 (STj5).

Subsequently, the guest virtual machine 530*b* in the second signal processing device 170*b* can signal-process the image stream data stored in the second shared memory 508*b* using the second shared memory 508*b*, and can be configured to render and display an image on the display.

Consequently, the image stream data signal-processed by the second signal processing device 170*b* can be displayed on the third display 180*c* or the fourth display 180*d*.

In particular, an image signal-processed by the signal processing device 170 and displayed on the first display 180*a* or the second display 180*b* and an image displayed on the third display 180*c* or the fourth display 180*d* can be displayed in a synchronized state.

In some implementations, the first virtual machine 520 in the processor 175 can be configured to write camera data in the first shared memory 508*a* and can transmit some of the camera data to the second signal processing device 170*b*, the server virtual machine 520*b* in the second processor 175*b* can be configured to write the received some of the camera data in the second shared memory 508*b*, and the guest virtual machine 530*b* or 540*b* in the second processor 175*b* can process at least some of the data written in the second shared memory 508*b* and can be configured to write the processed data in the second shared memory 508*b*.

In some implementations, the second virtual machine 530 in the processor 175 can be configured to display an image on the display based on the data written in the second shared memory 508*b*.

In some implementations, the first virtual machine 520 in the processor 175 can write some of the camera data in the first shared memory 508*a* to be transmitted to the second processor 175*b*, and the guest virtual machine 530*b* or 540*b* in the second processor 175*b* can perform object detection for the received camera data and can be configured to write the data from which an object has been detected in the second shared memory 508*b*. This will be described in detail with reference to FIG. 18.

Figure 18:
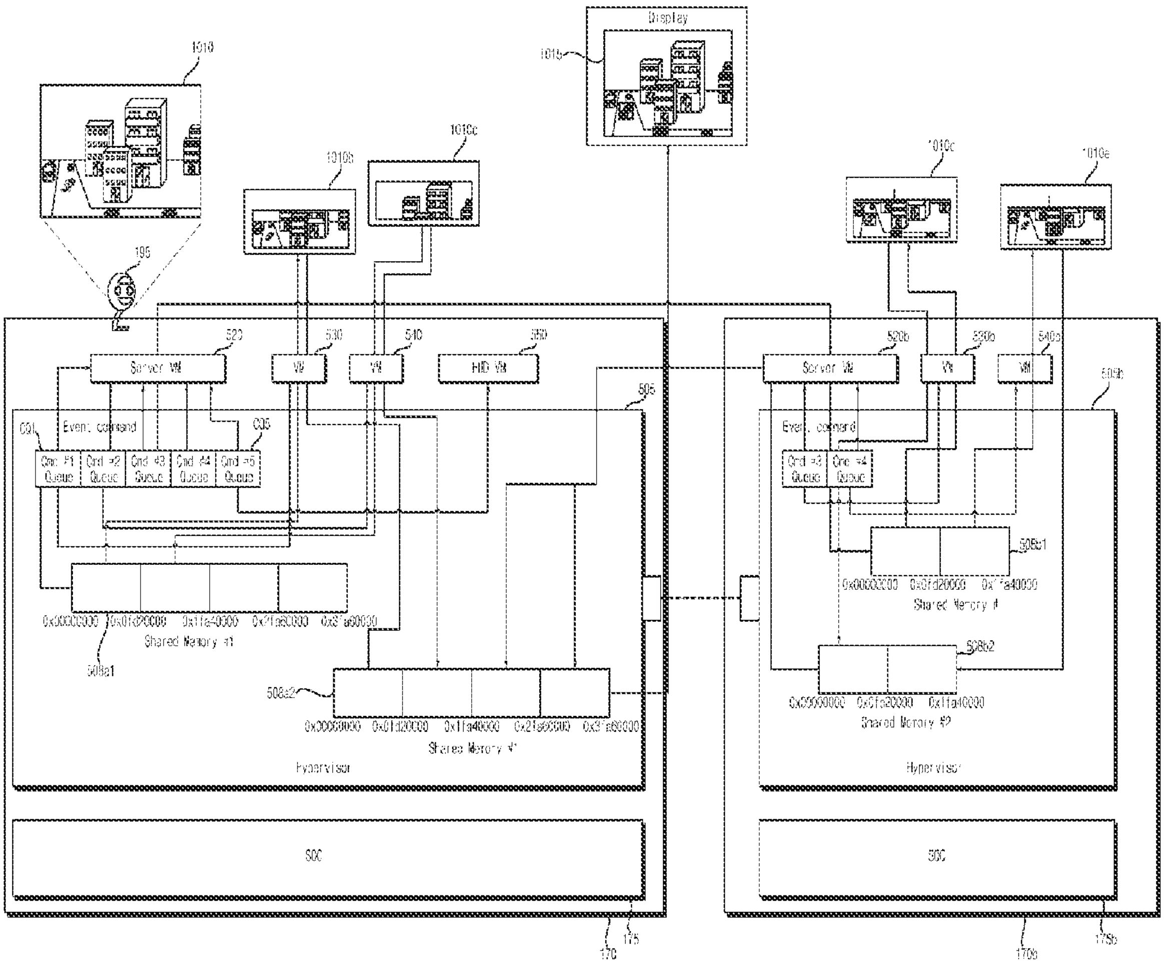

FIG. 18 illustrates that, in order to signal-process image data 1010 acquired through a camera 915, the signal processing device 170 and the second signal processing device 170*b* can divide and process the image data.

In some implementations, in response to data being image data 1010, the first virtual machine 520 in the processor 175 in the signal processing device 170 can write some 1010*b* of the image data 1010 in a first buffer of the shared memory 508*a*1, and may write some other 1010*c* of the image data 1010 in a second buffer of the shared memory 508*a*1.

The second virtual machine 530 and the third virtual machine 540 can detect objects from the received image data 1010*b* and 1010*c*, and can be configured to write the image data from which the objects have been detected in the shared memory 508.

Specifically, the second virtual machine 530 can write data from which an object BG1 has been detected in the first buffer in the second shared memory 508*a*2, and the third virtual machine 540 can write data from which an object BG2 has been detected in the second buffer in the second shared memory 508*a*2.

In some implementations, in response to the plurality of virtual machines 520*b*, 530*b*, and 540*b* being executed in the second signal processing device 170*b*, as depicted in FIG. 18, the first virtual machine 520 in the processor 175 can transmit some others 1010*d* and 1010*e* of the image data 1010 to the server virtual machine 520*b* driven by the second processor 175*b* in the second signal processing device 170*b*.

The server virtual machine 520*b* driven by the second processor 175*b* in the second signal processing device 170*b* can write the received some other 1010*d* of the image data 1010 in the first buffer in the second shared memory 508*b*2, and can write some other 1010*e* of the image data 1010 in the second buffer in the second shared memory 508*b*2.

The guest virtual machines 530*b* and 540*b* driven by the second processor 175*b* in the second signal processing device 170*b* can detect objects from the received image data 1010*d* and 1010*e*, and can be configured to write the image data from which the objects have been detected in the second shared memory 508*b*2.

Specifically, the first guest virtual machine 530*b* can write data from which an object BG3 has been detected in the first buffer in the second shared memory 508*b*2, and the second guest virtual machine 540*b* can write data from which an object BG4 has been detected in the second buffer in the second shared memory 508*b*2.

In some implementations, the server virtual machine 520*b* driven by the second processor 175*b* in the second signal processing device 170*b* can transmit the data from which the object has been detected, written in the second shared memory 508*b*2, to the first virtual machine 520 in the processor 175 in the signal processing device 170.

Consequently, the first virtual machine 520 in the processor 175 in the signal processing device 170 can be configured to display a processed image 1015 on the display based on the image data from which the object has been detected.

In some implementations, the display can be at least one of the first and second displays 180*a* and 180*b* controlled by the signal processing device 170 or at least one of the third and fourth displays 180*c* and 180*d* controlled by the second signal processing device 170*b*.

Consequently, distributed processing of data can be efficiently performed through the signal processing device 170 and the second signal processing device 170*b*.

Figure 19:
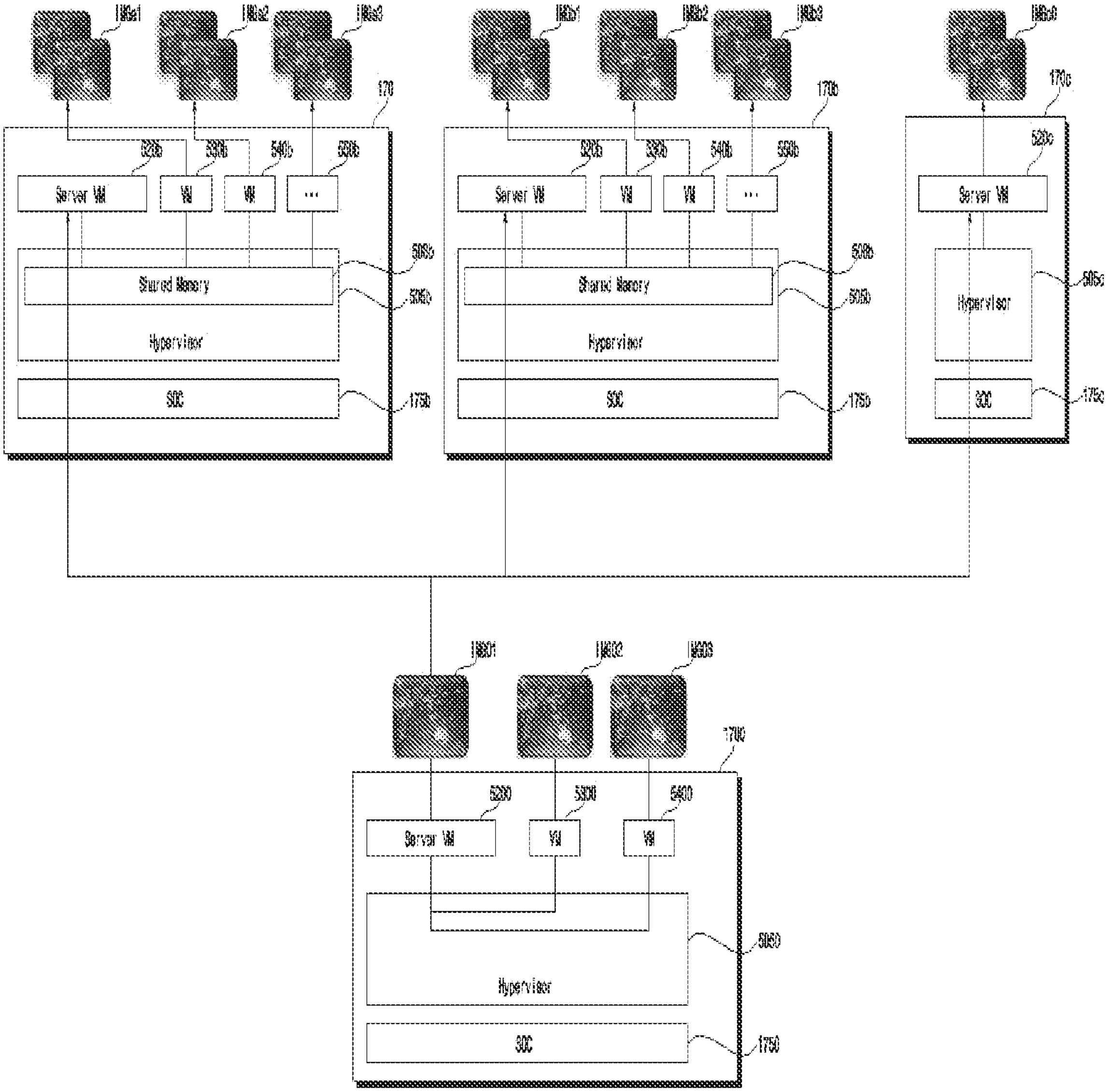

FIG. 19 is a diagram illustrating that image data processed by a main signal processing device 1700 is transmitted to the plurality of signal processing devices 170, 170*b*, and 170*c* and is displayed on the respectively displays.

The main signal processing device 1700 can be disposed in the display apparatus 100 for vehicle, or can be disposed in a separate remote server.

For example, the main signal processing device 1700 can be a signal processing device disposed in a server in an airplane.

By way of further example, the main signal processing device 1700 can be a signal processing device disposed in another vehicle.

The main signal processing device 1700 can drive a hypervisor 505 on a processor 175 therein, and can drive a server virtual machine 5200 and guest virtual machines 5300 and 5400 on the hypervisor 505.

A plurality of images IMGO1, IMGO2, and IMGO3 processed by the main signal processing device 1700 through the server virtual machine 5200 and guest virtual machines 5300 and 5400, respectively, can be displayed through a plurality of displays connected to the main signal processing device 1700.

In some implementations, image data processed by the main signal processing device 1700 can be synchronized, and can be transmitted to the plurality of signal processing devices 170, 170*b*, and 170*c*.

The plurality of signal processing devices 170, 170*b*, and 170*c* can process the image data received from the main signal processing device 1700 and can be configured to display images on the respective displays.

In the figure, hypervisors 505, 505*b*, and 505*c* can be driven on the processors 175, 175*b*, and 175*c* in the signal processing devices 170, 170*b*, and 170*c*, respectively, and server virtual machines 520, 520*b*, and 520*c*, first guest virtual machines 530, 530*b*, and 530*c*, and second guest virtual machines 540, 540*b*, and 540*c* can be driven on the hypervisors 505, 505*b*, and 505*c*, respectively.

The signal processing devices 170, 170*b*, and 170*c* can be configured to display processed images IMGa1, IMGa2, and IMGa3, processed images IMGb1, IMGb2, and IMGb3, and processed images IMGc1, IMGc2, and IMGc3 on the respectively displays in a synchronized state.

In particular, the main signal processing device 1700 and the signal processing devices 170, 170*b*, and 170*c* can display images in a synchronized state according to the synchronization scheme described with reference to FIGS. 8 to 18. Consequently, the same images can be simultaneously viewed.

What is claimed is:

1. A display apparatus for vehicle, the display apparatus comprising:

a first display and a second display implemented in a vehicle;

a first signal processing device comprising a first processor configured to perform signal processing for the first display and the second display; and a second signal processing device comprising a second processor configured to perform signal processing for a third display, wherein:

the first processor is configured to execute first, second, and third virtual machines on a hypervisor in the first processor, the first virtual machine in the processor is configured to, based on the first signal processing device being operated as a master signal processing device among the first signal processing device and the second signal processing device, share at least some of data with the second signal processing device for divided processing of data, the first virtual machine is configured to, based on a first shared memory being updated, transmit, to a server virtual machine executed in the second signal processing device, a shared memory identifier (ID) or a buffer ID and image data, the server virtual machine is configured to, based on a reference count for a second shared memory reaching a predetermined value, transmit, to the first virtual machine, information regarding the reference count, and the first virtual machine is configured to update a reference count for the first shared memory.

2. The display apparatus of claim 1, wherein the second processor is configured to execute the server virtual machine configured to, based on the second signal processing device being operated as a master signal processing device among the first signal processing device and the second signal processing device, share at least some of data with the first signal processing device for divided processing of data.

3. The display apparatus of claim 1, wherein the first virtual machine is configured to:

read capability information or resource information of the second signal processing device, and operate, based on the capability information or the resource information of the second signal processing device, any one of the second signal processing device or the first signal processing device as a master signal processing device.

4. The display apparatus of claim 3, wherein the first virtual machine is configured to:

transmit, to the second signal processing device, an access message for access to a deserializer network, and operate, based on an access allowance message for access to the deserializer network not being received from the second signal processing device, the first signal processing device as the master signal processing device.

5. The display apparatus of claim 3, wherein the first virtual machine is configured to:

transmit, to the second signal processing device, an access message for access to a deserializer network, and operate, based on an access allowance message for access to the deserializer network being received from the second signal processing device, any one of the second signal processing device or the first signal processing device as the master signal processing device based on the capability information or the resource information of the second signal processing device.

6. The display apparatus of claim 3, wherein the first virtual machine is configured to:

determine whether the server virtual machine in the second signal processing device is driven based on protocol information received from an outside of the display apparatus, and operate, based on the server virtual machine in the second signal processing device not being driven, the first signal processing device as the master signal processing device.

7. The display apparatus of claim 3, wherein the first virtual machine is configured to:

determine whether resources of the second signal processing device are sharable based on the capability information or the resource information of the second signal processing device, and share, based on the resources being sharable, at least some of processed data with the second signal processing device.

8. The display apparatus of claim 3, wherein the first virtual machine is configured to:

transmit, based on the first signal processing device being the master signal processing device, an authority transfer message to the server virtual machine in the second processor, and change, based on an acknowledgement message being received from the server virtual machine in the second processor, the second signal processing device to the master signal processing device.

9. The display apparatus of claim 1, wherein:

the first processor is configured to execute the first, second, and third virtual machines on the hypervisor in the processor, the second virtual machine is operated for the first display, and the third virtual machine is operated for the second display.

10. The display apparatus of claim 9, wherein the first virtual machine is configured to:

receive, from a sensor implemented in the vehicle, wheel speed sensor data of the vehicle, process the wheel speed sensor data, and transmit the processed wheel speed sensor data to at least one of the second virtual machine, the third virtual machine, or the second signal processing device.

11. The display apparatus of claim 1, wherein the first virtual machine is configured to:

receive, from the second signal processing device, capability information or resource information of a plurality of virtual machines driven in the second signal processing device, and control, based on the capability information or the resource information of the plurality of virtual machines, any one of the plurality of virtual machines driven in the second signal processing device.

12. The display apparatus of claim 1, wherein:

the first virtual machine in the first processor is configured to write camera data in a first shared memory and transmit some of the camera data to the second signal processing device, the second processor operates the server virtual machine configured to write the received some of the camera data in the second shared memory, and the second processor executes a guest virtual machine configured to (i) process at least some of the data written in the second shared memory and (ii) write the processed data in the second shared memory.

13. The display apparatus of claim 12, wherein the second virtual machine in the first processor is configured to display an image on the display based on the data written in the second shared memory.

14. The display apparatus of claim 12, wherein the first virtual machine in the first processor is configured to create a command queue for distributed processing of the data.

15. The display apparatus of claim 14, wherein the command queue comprises at least one of command type information, buffer ID information, or buffer address information.

16. The display apparatus of claim 12, wherein the first virtual machine in the processor is configured to create command queues corresponding to a number of virtual machines for distributed processing of the data.

17. The display apparatus of claim 12, wherein:

the first virtual machine in the first processor is configured to write, in the first shared memory, some of the camera data to be transmitted to the second processor, and the guest virtual machine in the second processor is configured to (i) perform object detection for the received camera data and (ii) write data from which an object has been detected in the second shared memory.

18. A display apparatus for vehicle, the display apparatus comprising:

a first display and a second display implemented in a vehicle;

a first signal processing device comprising a first processor configured to perform signal processing for the first display and the second display; and a second signal processing device comprising a second processor configured to perform signal processing for a third display, wherein:

the first processor is configured to execute first, second, and third virtual machines on a hypervisor in the first processor, and the first virtual machine is configured to:

determine capability information or resource information of the second signal processing device, and operate, based on the capability information or the resource information of the second signal processing device, any one of the second signal processing device or the first signal processing device as a master signal processing device, the first virtual machine is configured to, based on a first shared memory being updated, transmit, to a server virtual machine executed in the second signal processing device, a shared memory identifier (ID) or a buffer ID and image data, the server virtual machine is configured to, based on a reference count for a second shared memory reaching a predetermined value, transmit, to the first virtual machine, information regarding the reference count, and the first virtual machine is configured to update a reference count for the first shared memory.

19. The display apparatus of claim 18, wherein capability information or resource information is received from the second signal processing device.

20. The display apparatus of claim 18, wherein the first virtual machine is configured to:

determine whether resources of the second signal processing device are sharable based on the capability information or the resource information of the second signal processing device, and share, based on the resources being sharable, share at least some of processed data with the second signal processing device.

* * * * *